United States Patent
Iizuka

(10) Patent No.: US 6,999,216 B2
(45) Date of Patent: Feb. 14, 2006

(54) REFLECTIVE SCANNING OPTICAL SYSTEM

(75) Inventor: Takashi Iizuka, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/928,192

(22) Filed: Aug. 30, 2004

(65) Prior Publication Data
US 2005/0068598 A1    Mar. 31, 2005

(30) Foreign Application Priority Data
Aug. 28, 2003   (JP)  ............... 2003-304690

(51) Int. Cl.
*G02B 26/08*   (2006.01)
(52) U.S. Cl. ...................................... 359/206
(58) Field of Classification Search ............ 359/196, 359/205–208, 216
See application file for complete search history.

(56) References Cited

U.S. PATENT DOCUMENTS

| | | | | |
|---|---|---|---|---|
| 5,805,324 A | * | 9/1998 | Endou | ......................... 359/208 |
| 5,963,355 A | | 10/1999 | Iizuka | |
| 2003/0123118 A1 | | 7/2003 | Iizuka | |

FOREIGN PATENT DOCUMENTS

| | | |
|---|---|---|
| JP | 9-68664 | 3/1997 |
| JP | 11-242178 | 9/1999 |
| JP | 2004-13109 | 1/2004 |
| JP | 2004-13110 | 1/2004 |
| JP | 2004-13111 | 1/2004 |

OTHER PUBLICATIONS

English Language Abstract of JP 2004-13109.
English Language Abstract of JP 2004-13110.
English Language Abstract of JP 2004-13111.

* cited by examiner

*Primary Examiner*—Euncha P. Cherry
(74) *Attorney, Agent, or Firm*—Greenblum & Bernstein, P.L.C.

(57) ABSTRACT

There is provided a reflective scanning optical system, which includes a light source unit for emitting a beam, a polygon mirror, and a single fθ optical element. Magnification $m_z$ of the fθ optical element in an auxiliary scanning direction is set to satisfy: $-4 < m_z < -2$ ... (1). The light source unit is set so that a central axis of the beam incident upon the polygon mirror from the light source unit will be in a plane orthogonal to the rotation axis of the polygon mirror and out of an effective scan range of the beam dynamically deflected by the polygon mirror in regard to a main scanning direction. Each reflecting surface of the polygon mirror and the scan target surface are optically conjugate with each other in regard to the auxiliary scanning direction. The beam incident upon the first surface of the fθ optical element and the beam emerging from the first surface are separated from each other in the auxiliary scanning direction.

11 Claims, 10 Drawing Sheets

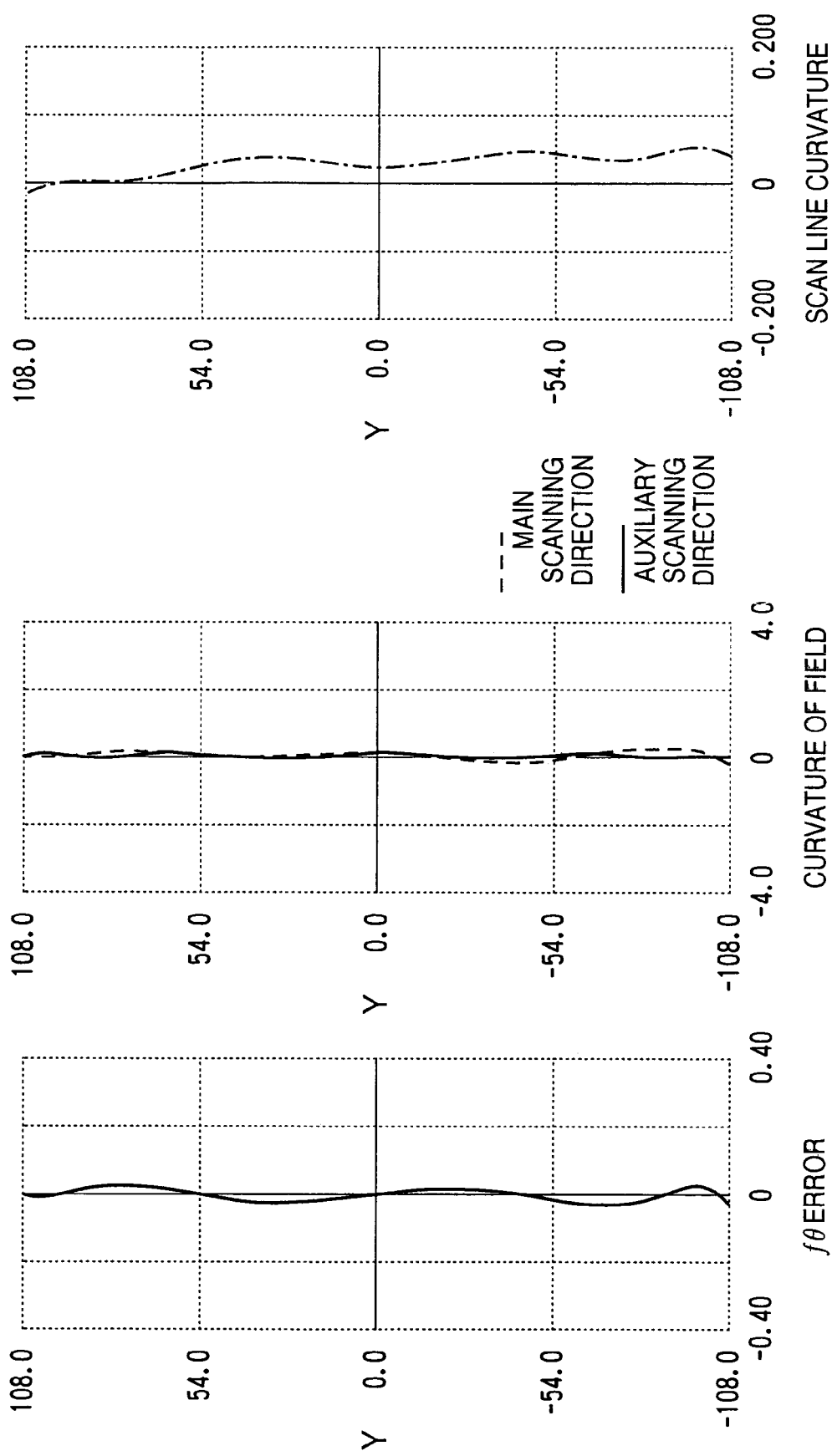

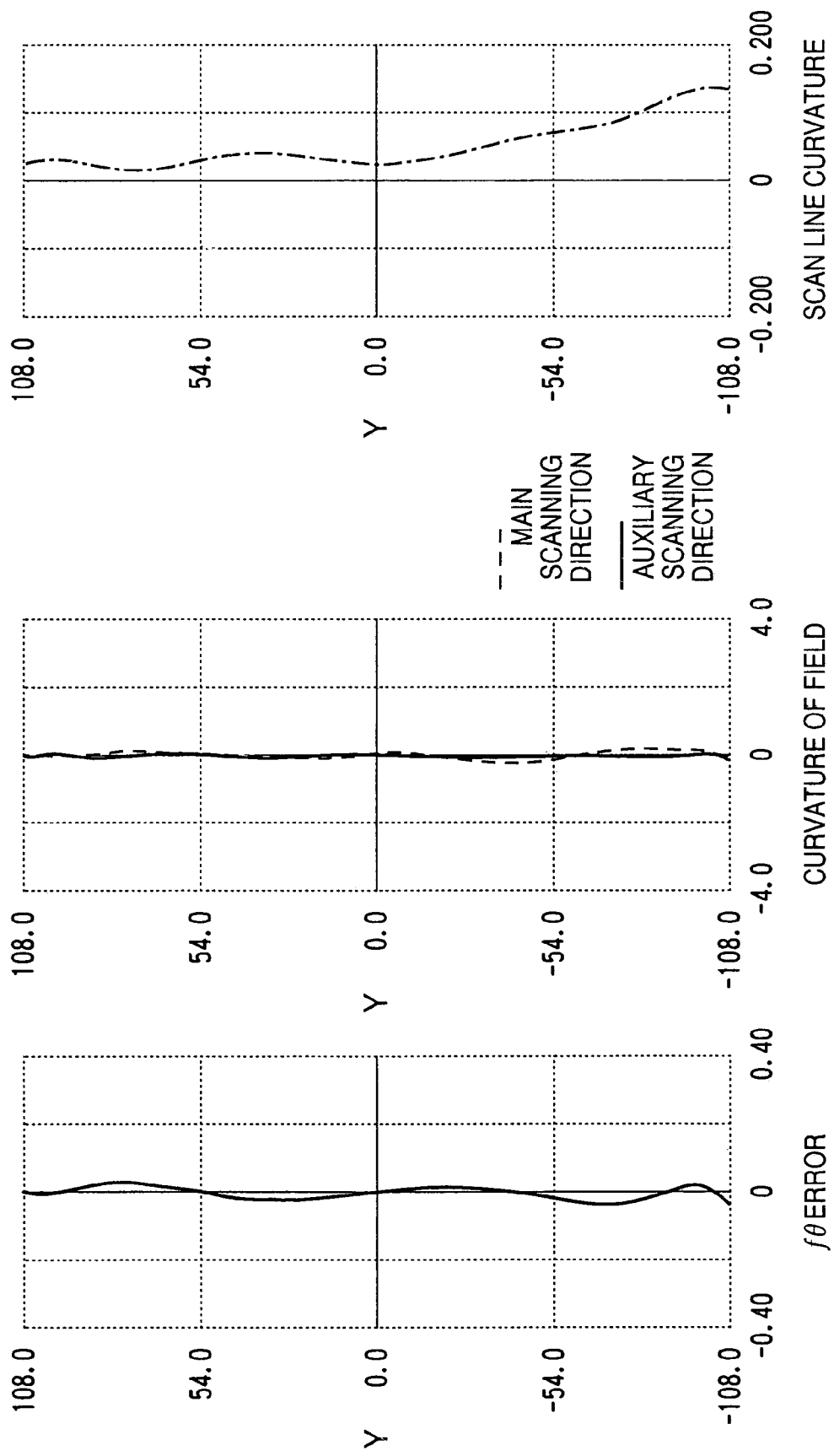

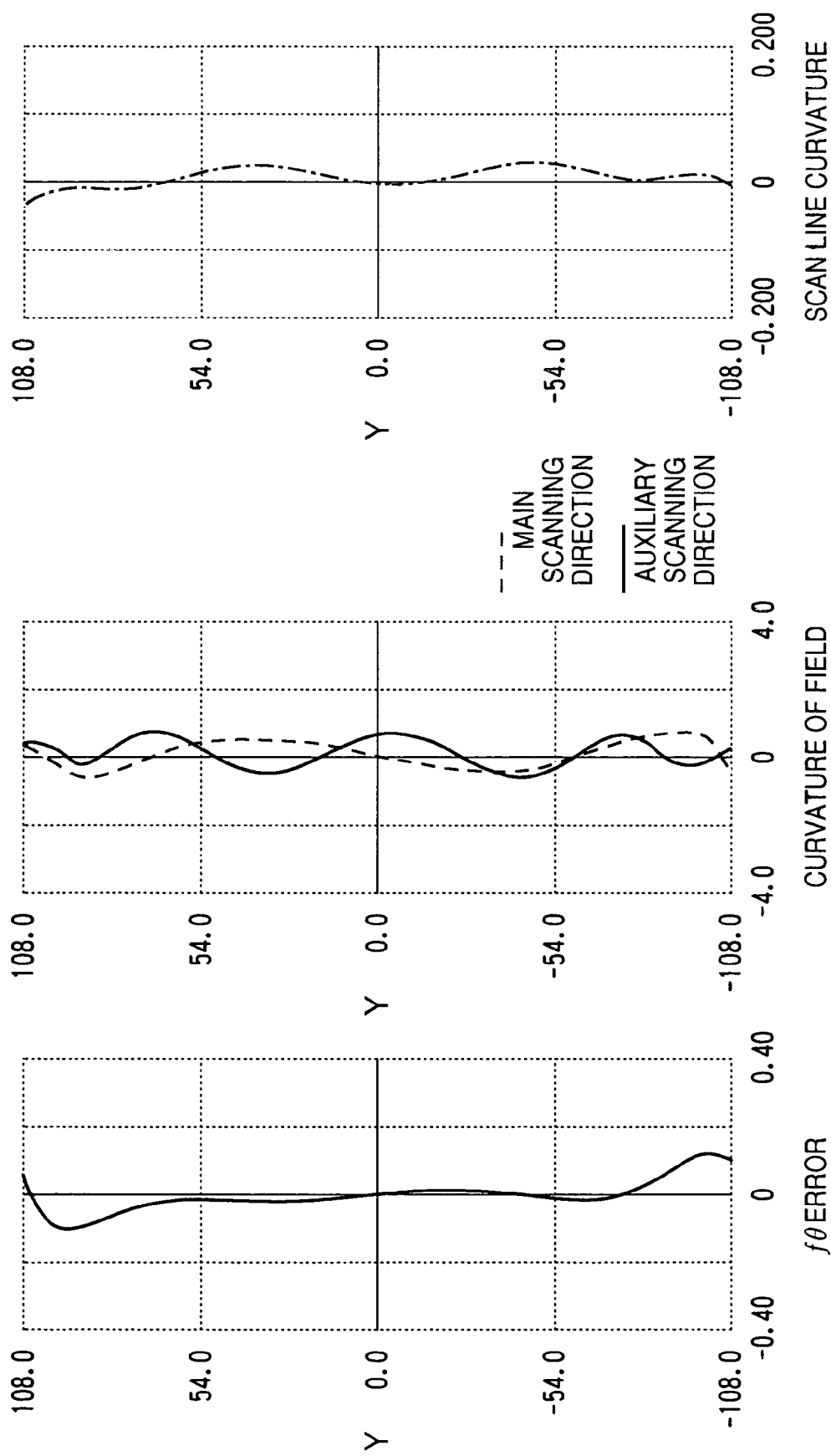

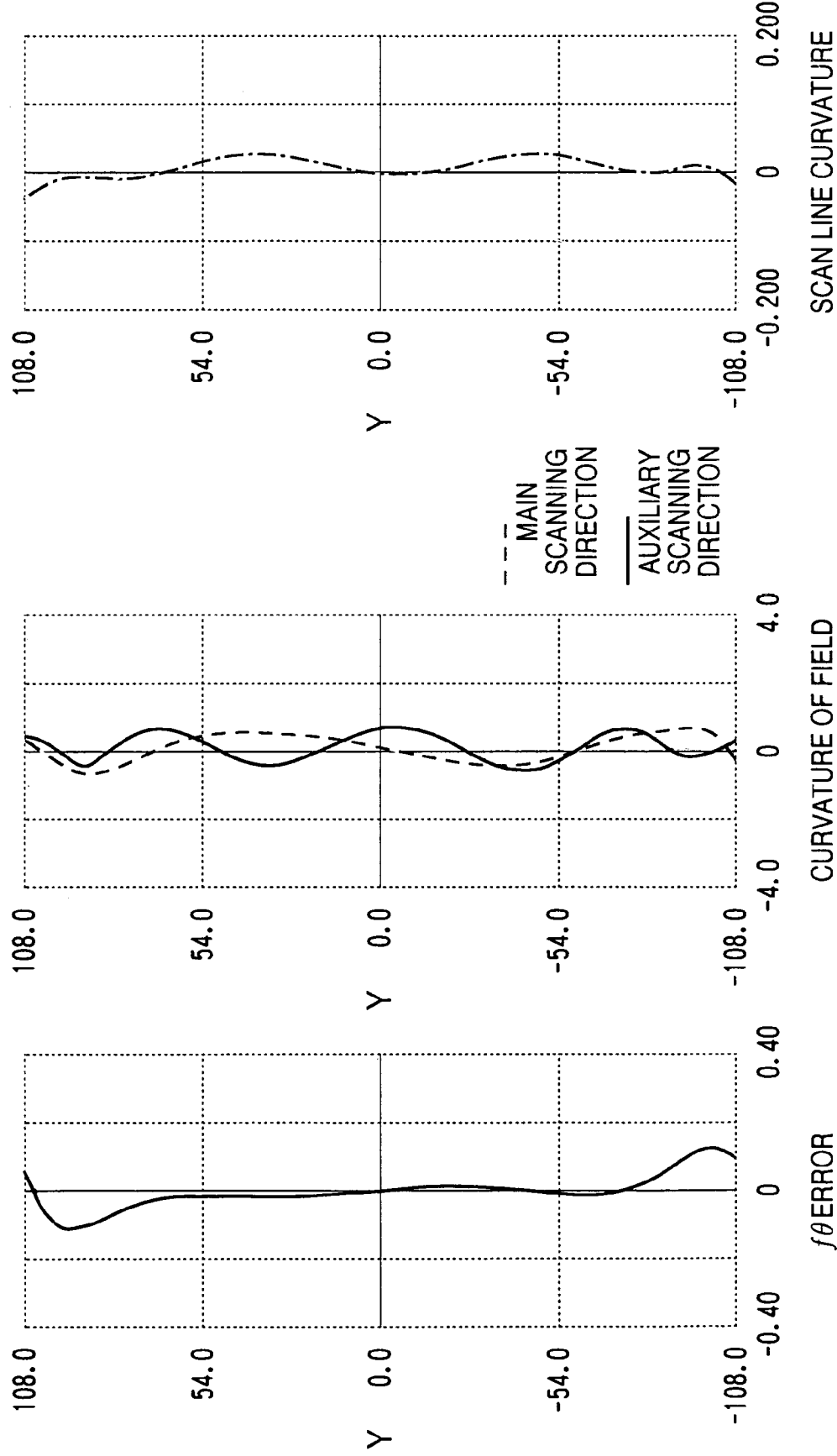

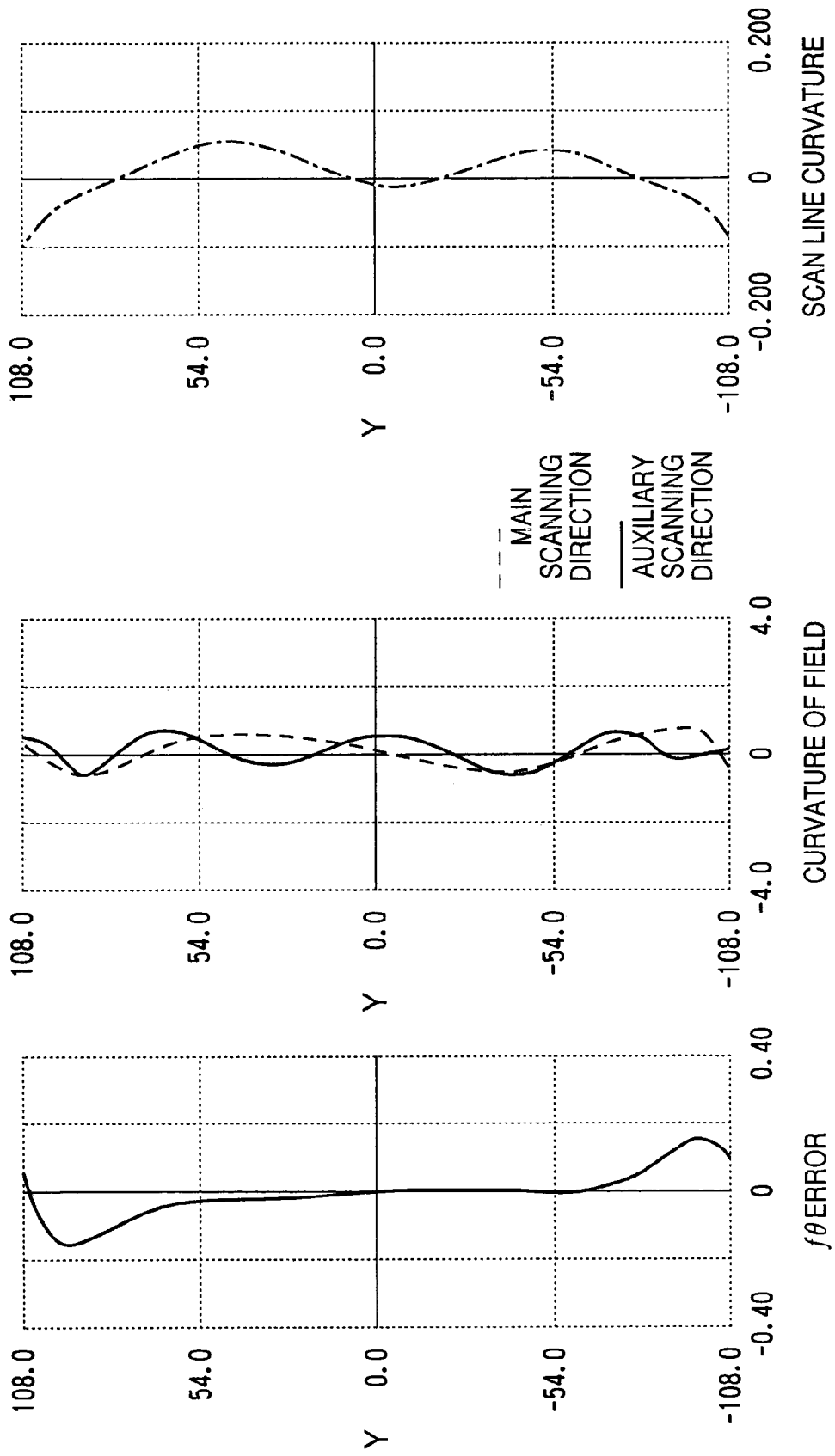

REFLECTIVE SCANNING OPTICAL SYSTEM

BACKGROUND OF THE INVENTION

The present invention relates to a scanning optical system which is employed for a beam scanning unit of a device such as a laser printer, and in particular, to a reflective scanning optical system which dynamically deflects (scans) a beam in a main scanning direction by a rotating polygon mirror and focuses the scanned beam on a scan target surface (photosensitive drum, etc.) via a single fθ optical element having a first surface as a refracting surface and a second surface as a reflecting surface.

A reflective scanning optical system of this type has been disclosed in U.S. Pat. No. 5,963,355, for example. FIG. 11 is a perspective view showing the overall configuration of the reflective scanning optical system disclosed in the publication. A laser beam emitted by a laser diode (semiconductor laser) 10 as a diverging beam is collimated by a collimator lens 20 into a collimated beam and then converged by an anamorphic lens 30 in an auxiliary scanning direction only.

The laser beam emerging from the anamorphic lens 30 is reflected by a flat mirror 31 toward a rotating polygon mirror 50. The laser beam incident on a reflecting surface of the rotating polygon mirror 50 is reflected by the reflecting surface and thereby dynamically deflected in the main scanning direction. The laser beam dynamically deflected by the polygon mirror 50 is then focused on a photosensitive drum 60 by a single fθ optical element 40. The fθ optical element 40 has a first surface 41 for refracting the laser beam and a second surface 42 for reflecting the laser beam.

However, since the polygon mirror 50 is manufactured by cutting and grinding each of its reflecting surfaces, variations tend to occur in the distance from the rotation axis to each reflecting surface 51. In the reflective scanning optical system described above, the variations in the distance from the rotation axis of the polygon mirror 50 to each reflecting surface 51 causes variations in the position (displacement) of a deflecting point (where the laser beam is deflected) on each reflecting surface 51 of the polygon mirror 50 in the auxiliary scanning direction, by which the interval between the scan lines on the scan target surface (photosensitive drum 60) becomes uneven and thereby the print quality is deteriorated (i.e., jitters in the auxiliary scanning direction are caused).

FIG. 12 shows a configuration of the reflective scanning optical system of FIG. 11 with regard to the auxiliary scanning direction. As shown in FIG. 12, when a reflecting surface of the polygon mirror 50 is at the position shown with the solid line 51, the beam reflected by the reflecting surface 51 reaches a point A on the photosensitive drum 60 via the path shown with the solid lines. However, if the reflecting surface shifts to the position shown with the broken line 51A, the beam reflected by the reflecting surface 51A reaches a point B on the photosensitive drum 60 via the path shown with the broken lines.

Therefore, such variations causes uneven scan line intervals and deteriorated print quality. Since the displacement of the deflecting point in the auxiliary scanning direction translates into the deterioration on the scan target surface (uneven scan line intervals, etc.) depending on the magnification of the fθ optical element 40, the deterioration becomes more serious as the magnification of the fθ optical element 40 gets larger.

Further, the second surface 42 is formed in a "twisted" shape (i.e., a sectional form in the main scanning direction changes depending on the height in the auxiliary scanning direction) in order to correct "skew distortion" which is caused by rotation of the beam around its central axis (due to the separation of the incident beam and the reflected beam in the auxiliary scanning direction).

Therefore, if the reflecting point (deflecting point) moves in the auxiliary scanning direction due to the variations in the distance from the rotation axis of the rotating polygon mirror 50 to each reflecting surface, a beam incident position on the second surface 42 measured in the auxiliary scanning direction changes depending on which reflecting surface of the polygon mirror 50 reflects the beam, by which a scan width on the scan target surface fluctuates and thereby the print quality is deteriorated (i.e., jitters in the main scanning direction are caused).

SUMMARY OF THE INVENTION

The present invention is advantageous in that it provides a reflective scanning optical system capable of suppressing jitters in a main scanning direction and an auxiliary scanning direction even when there exist variations in the distance from a rotation axis of a rotating polygon mirror to each reflecting surface.

In accordance with a first aspect of the present invention, there is provided a reflective scanning optical system, which is provided with a light source unit for emitting a beam, a polygon mirror having a plurality of reflecting surfaces parallel to its rotation axis, for reflecting and dynamically deflecting the beam emitted by the light source unit, and a single fθ optical element having a first surface for refracting the beam dynamically deflected by the polygon mirror and a second surface for reflecting the beam refracted by the first surface and thereby letting the beam emerge from the first surface, for converging the beam on a scan target surface.

Further, in the reflective scanning optical system, magnification $m_z$ of the fθ optical element in an auxiliary scanning direction is set to satisfy:

$$-4 < m_z < -2 \qquad (1)$$

The light source unit is set so that a central axis of the beam incident upon the polygon mirror from the light source unit will be in a plane orthogonal to the rotation axis of the polygon mirror and out of an effective scan range of the beam dynamically deflected by the polygon mirror in regard to a main scanning direction. The fθ optical element is placed so as to set each reflecting surface of the polygon mirror and the scan target surface optically conjugate with each other in regard to the auxiliary scanning direction and separate the beam incident upon the first surface and the beam emerging from the first surface from each other in the auxiliary scanning direction.

By a configuration described above, the beam, traveling in the plane orthogonal to the rotation axis of the polygon mirror, is incident upon the polygon mirror. Therefore, even when there exist the variations in the distance from the rotation axis to each reflecting surface of the polygon mirror, the displacement of the deflecting point in the auxiliary scanning direction does not occur and the aforementioned jitters in the main scanning direction and the auxiliary scanning direction caused by the displacement can be eliminated. The jitters caused by the variations in the distance from the rotation axis to each reflecting surface of the polygon mirror become severer when the fθ optical element is a magnifying optical system, while the jitters become negligible in reducing optical systems. Therefore, the magnification $m_z$ in the auxiliary scanning direction is limited to the range (1).

Optionally, the second surface of the fθ optical element may be a reflecting surface having positive power both in the main scanning direction and in the auxiliary scanning direction with its concave side facing the polygon mirror and is asymmetric both in the main scanning direction and in the auxiliary scanning direction.

Still optionally, the second surface of the fθ optical element may be formed to satisfy the following conditions (2) and (3):

$$0.15\Delta dz/dx(+1.0P) < \Delta dz/dx(+0.5P) < 0.30\Delta dz/dx(+1.0P) \quad (2)$$

$$0.45\Delta dz/dx(+1.0P) < \Delta dz/dx(+0.8P) < 0.60\Delta dz/dx(+1.0P) \quad (3)$$

where "$\Delta dz/dx(Y)$" denotes a change in inclination $dz/dx$ at a position with a height Y in the main scanning direction from a reference axis as the central axis and its elongation of the beam incident on the first surface to be orthogonal to the scan target surface in regard to the main scanning direction and "P" denotes the distance from the polygon mirror to the fθ optical element.

Still optionally, the second surface of the fθ optical element may satisfy the following conditions (4) and (5):

$$\Delta dz/dx(+0.8P)/\Delta dz/dx(+1.0P) < \Delta dz/dx(-0.8P)/\Delta dz/dx(-1.0P) \quad (4)$$

$$\Delta dz/dx(+0.5P)/\Delta dz/dx(+1.0P) < \Delta dz/dx(-0.5P)/\Delta dz/dx(-1.0P) \quad (5)$$

Still optionally, the fθ optical element may satisfy the following conditions (6) and (7):

$$0.0010 < \delta(+1.0P) - \delta(+0.8P) < 0.0018 \quad (6)$$

$$0.0007 < \delta(-1.0P) - \delta(-0.8P) < 0.0013 \quad (7)$$

where $\delta(Y) = \Delta C1_z(Y) - 2\Delta C2_z(Y)$ where "$\Delta C1_z(Y)$" denotes a change in curvature of the first surface in the auxiliary scanning direction at a position with a height Y in the main scanning direction from the reference axis, "$\Delta C2_z(Y)$" denotes a change in curvature of the second surface in the auxiliary scanning direction at the position with the height Y in the main scanning direction from the reference axis, and a sign of the height Y is minus on a side where the beam from the light source unit is incident on the polygon mirror and plus on an opposite side.

In a particular case, the light source unit may include a light source for emitting the beam, a collimator lens for collimating the beam emitted by the light source into a collimated beam, and an anamorphic lens for focusing the beam from the collimator lens in the auxiliary scanning direction in the vicinity of a reflecting surface of the polygon mirror.

In a particular case, each of the first and second surfaces of the fθ optical element may be formed to be asymmetric with respect to its origin both in the main scanning direction and in the auxiliary scanning direction and the origin of each surface is shifted from the reference axis in the main scanning direction.

In a particular case, the first surface of the fθ optical element may be formed to be asymmetric with respect to its origin in the main scanning direction and symmetric with respect to the origin in the auxiliary scanning direction with the origin shifted from the reference axis in the main scanning direction. The second surface of the fθ optical element is formed to be asymmetric with respect to the origin both in the main scanning direction and in the auxiliary scanning direction with the origin shifted from the reference axis in the main scanning direction.

In a particular case, the first surface of the fθ optical element may be formed to be symmetric with respect to its origin both in the main scanning direction and in the auxiliary scanning direction with the origin shifted from the reference axis in the main scanning direction. The second surface of the fθ optical element is formed to be asymmetric with respect to the origin both in the main scanning direction and in the auxiliary scanning direction with the origin shifted from the reference axis in the main scanning direction.

BRIEF DESCRIPTION OF THE ACCOMPANYING DRAWINGS

The objects and features of the present invention will become more apparent from the consideration of the following detailed description taken in conjunction with the accompanying drawings, in which:

FIGS. 5A through 5C are graphs showing aberrations of a reflective scanning optical system of a first example of the embodiment, in which FIG. 5A shows fθ error, FIG. 5B shows field curvature, and FIG. 5C shows scan line curvature;

FIGS. 6A through 6C are graphs showing the aberrations of a reflective scanning optical system of a second example of the embodiment;

FIGS. 8A through 8C are graphs showing the aberrations of a reflective scanning optical system of a fourth example of the embodiment;

FIGS. 9A through 9C are graphs showing the aberrations of a reflective scanning optical system of a fifth example of the embodiment;

FIGS. 10A through 10C are graphs showing the aberrations of a reflective scanning optical system of a sixth example of the embodiment;

DETAILED DESCRIPTION OF THE EMBODIMENTS

Figure 1:
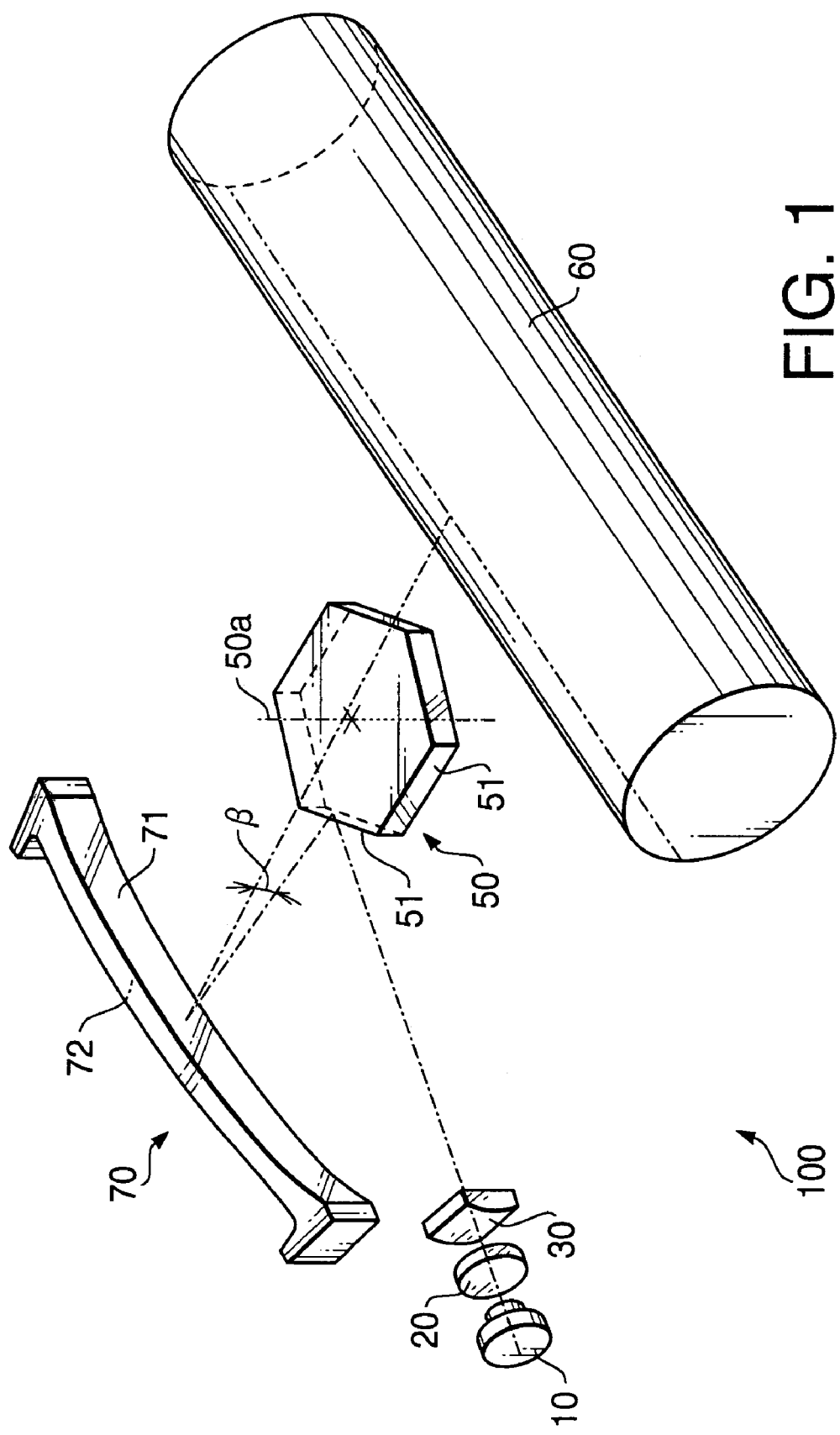
FIG. 1 is a perspective view showing the composition of a reflective scanning optical system in accordance with an embodiment of the present invention.

Referring now to the drawings, a description will be given in detail of preferred embodiments in accordance with the present invention. A device described in the following embodiments is an exposure unit which is employed for a laser printer. The exposure unit scans a laser beam (which has been ON/OFF modulated according to an input image signal) on a photosensitive drum as a scan target surface and thereby forms an electrostatic latent image on the photosensitive drum.

In the following explanation, a direction in which a beam spot moves (i.e., a direction in which a scanning line extends) on a scan target surface will be referred to as a main scanning direction. Further, a direction in which the scan target surface moves with respect to the scanning line (i.e., the rotation direction of a photoconductive drum 60) will be referred to as an auxiliary scanning direction. Further, shapes of optical elements, directions of powers of the optical elements and the like are described with reference to the main and auxiliary scanning directions on the scan target surface. That is, if an optical element is described to have a refractive power in the main scanning direction, the power affects the beam in the main scanning direction on the scan target surface regardless of the orientation of the optical element.

Figure 2:
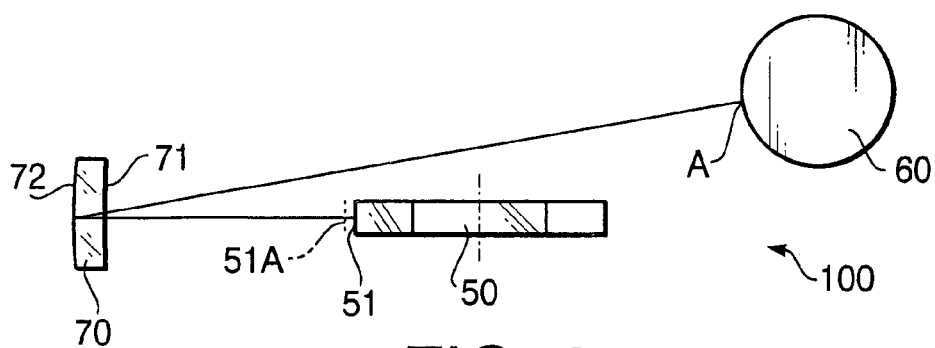
FIG. 2 is an explanatory drawing of the reflective scanning optical system of FIG. 1 seen in the main scanning direction.

FIG. 1 is a perspective view showing a configuration of a reflective scanning optical system 100 according to an embodiment of the present invention. FIG. 2 is a side view of the reflective scanning optical system 100, in which the vertical direction corresponds to the auxiliary scanning direction. A laser beam emitted by a laser diode (semiconductor laser) 10 as a diverging beam is collimated by a collimator lens 20 into a collimated beam and then converged by an anamorphic lens 30 (having strong positive refractive power in the auxiliary scanning direction and weak negative refractive power in the main scanning direction) in the auxiliary scanning direction only.

The laser beam emerging from the anamorphic lens 30 travels to a rotating polygon mirror 50 having a plurality of (six in this embodiment) reflecting surfaces 51 parallel to a rotation axis 50a. The laser beam incident on a reflecting surface of the rotating polygon mirror 50 is reflected by the reflecting surface and thereby dynamically deflected in the main scanning direction. The laser beam dynamically deflected by the polygon mirror 50 is then incident on an fθ optical element 70.

Incidentally, a light source unit (including the laser diode 10, the collimator lens 20 and the anamorphic lens 30) is set so that the central axis of the beam incident on the rotating polygon mirror 50 from the light source unit will be in a plane orthogonal to the rotation axis 50a of the polygon mirror 50 (main scanning plane) and out of an effective scan range (in regard to the main scanning direction) of the beam dynamically deflected by the rotating polygon mirror 50. Thus, the central axis of the beam is in the main scanning plane all the way from the light source unit to the fθ optical element.

The fθ optical element 70, which is a single element formed of a light transmitting material such as transparent plastic, has a first surface 71 for transmitting the beam dynamically deflected by the rotating polygon mirror 50 and a second surface 72 for reflecting the beam traveling thereto through the first surface 71 and the light transmitting material by backside reflection and thereby letting the beam emerge from the first surface 71. The second surface 72 is provided with a reflective coating of silver, aluminum, etc. by vapor deposition.

The beam emerging from the first surface 71 of the fθ optical element 70 travels toward the rotating polygon mirror 50 again with a separation angle β in the auxiliary scanning direction relative to the incident beam, passes over the rotating polygon mirror 50 as shown in FIGS. 1 and 2, and reaches the photosensitive drum 60 as the scan target surface to form a beam spot which scans the scan target surface in the main scanning direction (i.e., the direction of generating lines of the photosensitive drum 60).

In regard to the auxiliary scanning direction, the laser beam is once focused by the anamorphic lens 30 at a point in the vicinity of a reflecting surface 51 of the rotating polygon mirror 50 and is focused again by the power of the fθ optical element 70 at a point on the photosensitive drum 60. In other words, the fθ optical element 70 sets the reflecting surface 51 of the polygon mirror 50 and the surface of the photosensitive drum 60 optically conjugate with each other in regard to the auxiliary scanning direction. By such configuration, deviation of scan lines on the photosensitive drum 60, caused by a facet error of each reflecting surface 51 of the polygon mirror 50, can be prevented.

By the arrangement described above, the displacement of a deflecting point (reflecting position) in the auxiliary scanning direction can be avoided even when there exist the variations in the distance from the rotation axis 50a to each reflecting surface 51 of the polygon mirror 50. As shown in FIG. 2, when a reflecting surface of the polygon mirror 50 is at the position shown with the solid line 51, the beam reflected by the reflecting surface 51 reaches a point A on the photosensitive drum 60 via the path shown with the solid lines.

Even if the reflecting surface shifts to the position shown with the broken line 51A, the path of the beam does not change since the beam is just reflected in the direction orthogonal to the auxiliary scanning direction, by which the beam reaches the same point A on the photosensitive drum 60 via the path shown with the solid lines. Therefore, the jitters in the auxiliary scanning direction, caused by the variations in the distance from the rotation axis 50a to each reflecting surface 51 of the polygon mirror 50, can be eliminated.

Further, since the deflecting point (reflecting position) does not move in the auxiliary scanning direction even if the distance from the rotation axis 50a to each reflecting surface 51 changes, the beam incident height on the fθ optical element 70 (measured in the auxiliary scanning direction) is also kept constant. Therefore, the jitter in the main scanning direction (fluctuation in the scan width on the scan target surface) can be prevented also when the second surface 72 is formed in the aforementioned "twisted" shape (sectional form in the main scanning direction changes depending on the height in the auxiliary scanning direction).

In this embodiment, magnification $m_z$ of the fθ optical element 70 in the auxiliary scanning direction is set to satisfy the following condition (1):

$$-4 < m_z < -2 \tag{1}$$

The jitters caused by the variations in the distance from the rotation axis 50a to each reflecting surface 51 of the polygon mirror 50 become severer when the fθ optical element is a magnifying optical system, while the jitters become negligible in reducing optical systems. Therefore, the magnification $m_z$ in the auxiliary scanning direction is limited to the range (1) in this embodiment.

In cases where the fθ optical element 70 is made of plastic, it is desirable that most of the power of the fθ optical element 70 be implemented by the reflective second surface 72 in order to reduce ill effects of variations in the refractive index caused by temperature change. Therefore, the second surface 72 is formed as a reflecting surface having positive power both in the main scanning direction and in the auxiliary scanning direction with its concave side facing the polygon mirror 50.

If we define a "reference axis" as the central axis (and its elongation) of the beam incident upon the first surface 71 to be orthogonal to the photosensitive drum 60 in regard to the main scanning direction, in the case where the beam from the laser diode 10 is incident on the rotating polygon mirror 50 from outside the effective scan range and the incident beam and the emerging beam at the fθ optical element 70 are separated from each other in the auxiliary scanning direction as above, curvature of field (image surface curvature) and the displacement of the scan lines in the auxiliary scanning direction become asymmetric with respect to the reference axis. In order to correct the asymmetry, the second surface 72 is designed to be asymmetric both in the main scanning direction and in the auxiliary scanning direction.

The second surface 72 of the fθ optical element 70 may be formed to satisfy the following conditions (2) and (3):

$$0.15 \Delta dz/dx(+1.0P) < \Delta dz/dx(+0.5P) < 0.30 \Delta dz/dx(+1.0P) \quad (2)$$

$$0.45 \Delta dz/dx(+1.0P) < \Delta dz/dx(+0.8P) < 0.60 \Delta dz/dx(+1.0P) \quad (3)$$

where "$\Delta dz/dx(Y)$" denotes the change in the inclination $dz/dx$ at a position with a height Y in the main scanning direction from the reference axis, and "P" denotes the distance from the rotating polygon mirror 50 to the fθ optical element 70.

The above conditions (2) and (3) are those for reducing the displacement of the scan line (formed on the photosensitive drum 60) in the auxiliary scanning direction. The condition (2) is for maintaining high linearity of the central part of the scan line. Exceeding the upper limit or falling below the lower limit causes a curved scan line in the shape of a letter "W" or "M". The condition (3) is for maintaining high linearity of both ends of the scan line. Exceeding the upper limit or falling below the lower limit causes sharp curves at both ends of the scan line.

Further, the second surface 72 in this embodiment may be formed to satisfy the following conditions (4) and (5):

$$\Delta dz/dx(+0.8P)/\Delta dz/dx(+1.0P) < \Delta dz/dx(-0.8P)/\Delta dz/dx(-1.0P) \quad (4)$$

$$\Delta dz/dx(+0.5P)/\Delta dz/dx(+1.0P) < \Delta dz/dx(-0.5P)/\Delta dz/dx(-1.0P) \quad (5)$$

The condition (4) is for reducing effects of asymmetry of the movement of the deflecting point (change in the reflecting position caused by the rotation of the polygon mirror 50). Since the beam from the light source unit is incident on the rotating polygon mirror 50 obliquely in the main scanning plane, the movement of the deflecting point becomes asymmetric with respect to the reference axis, by which optical characteristics in the auxiliary scanning direction becomes asymmetric if the surface configuration of the fθ optical element 70 is symmetric with respect to the reference axis. Therefore, by giving the asymmetry to the change in the inclination in the auxiliary scanning direction to satisfy the conditions (4) and (5), the asymmetry of the optical characteristics in the auxiliary scanning direction can be corrected in cooperation with conditions (2) and (3).

Further, the fθ optical element 70 of this embodiment may be formed to satisfy the following conditions (6) and (7):

$$0.0010 < \delta(+1.0P) - \delta(+0.8P) < 0.0018 \quad (6)$$

$$0.0007 < \delta(-1.0P) - \delta(-0.8P) < 0.0013 \quad (7)$$

where $\delta(Y) = \Delta C1_z(Y) - 2\Delta C2_z(Y)$ where "$\Delta C1_z(Y)$" denotes the change in the curvature of the first surface 71 in the auxiliary scanning direction at a position with a height Y in the main scanning direction from the reference axis, "$\Delta C2_z(Y)$" denotes the change in the curvature of the second surface 72 in the auxiliary scanning direction at the position with the height Y in the main scanning direction from the reference axis, and the sign of the height Y is minus on the side where the beam from the light source unit is incident on the polygon mirror 50 and plus on the opposite side.

The above conditions (6) and (7) are those for flattening the auxiliary scanning field (the shape of the field (image surface) in the auxiliary scanning direction). The condition (7) describes the side (scan area) in which the beam from the light source unit is incident on the polygon mirror 50, while the condition (6) describes the opposite side (opposite scan area). In both conditions (6) and (7), exceeding the upper limit causes a too small value ("under") of the auxiliary scanning field curvature (the curvature of field in the auxiliary scanning direction), while falling below the lower limit causes a too large value ("over") of the auxiliary scanning field curvature.

In order to reduce the asymmetry of the auxiliary scanning field caused by the movement of the deflecting point, the change in the curvature in the auxiliary scanning direction is set to be asymmetric between the plus side and the minus side, as shown in the conditions (6) and (7).

In the following, six concrete examples of the reflective scanning optical system in accordance with the above embodiment of the present invention will be described.

FIRST EXAMPLE

Figure 3:
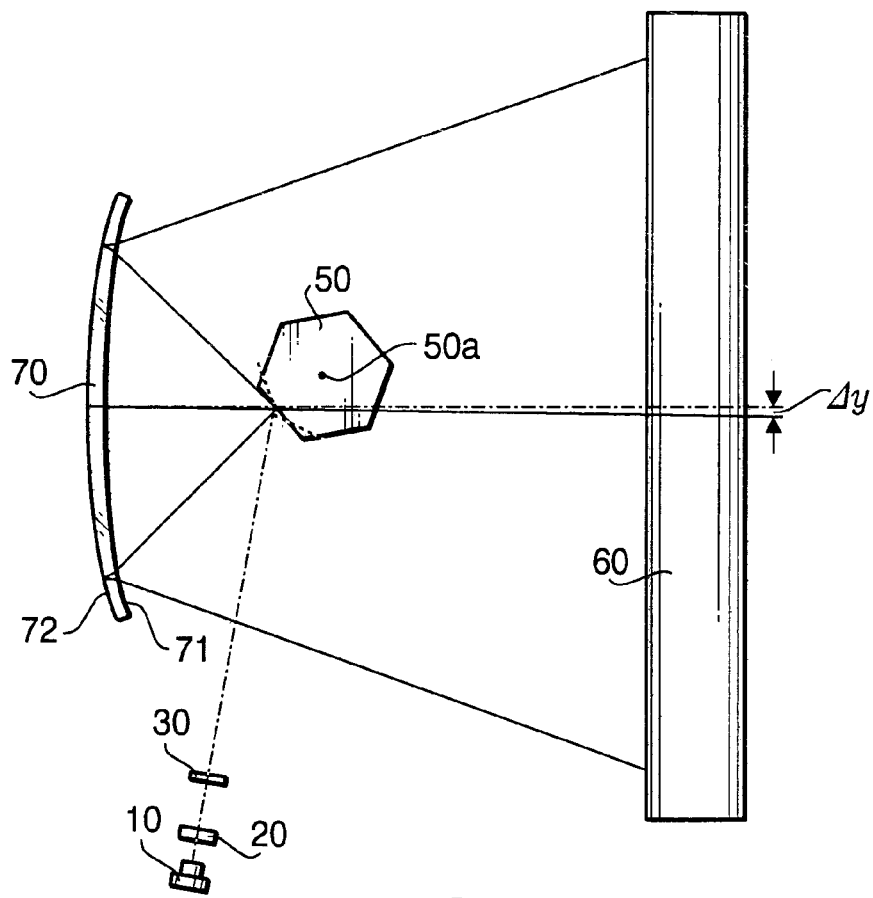
FIG. 3 is an explanatory drawing of a reflective scanning optical system in accordance with a first example of the embodiment of the present invention seen in the auxiliary scanning direction.
Figure 4:
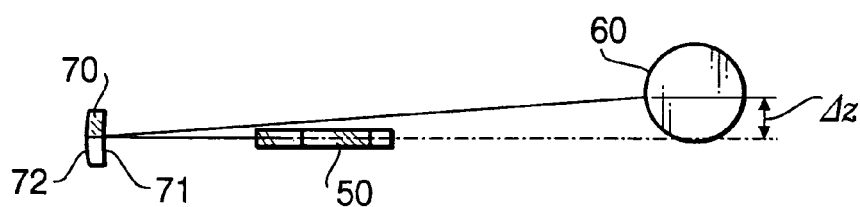
FIG. 4 is an explanatory drawing of the reflective scanning optical system of the first example seen in the main scanning direction.

FIG. 3 is an explanatory drawing of a reflective scanning optical system in accordance with a first example of the embodiment of the present invention seen in the auxiliary scanning direction, and FIG. 4 is an explanatory drawing of the reflective scanning optical system of the first example seen in the main scanning direction, wherein the chain line indicates the reference axis.

The following Table 1 shows specific numerical configuration of each optical surface of the reflective scanning optical system of the first example. In Table 1, the symbol "ry" denotes curvature radius [mm] of each optical surface in the main scanning direction, "rz" denotes curvature radius [mm] of each optical surface in the auxiliary scanning direction (omitted for rotationally symmetric surfaces), "d" denotes the distance from the optical surface to the next optical surface measured on the optical axis [mm], "n" denotes the refractive index of a medium between the optical surface and the next optical surface at a design wavelength 780 nm (omitted for air).

The optical surfaces shown in Table 1 are numbered in order of the propagation of the laser beam, in which the surface number "1" denotes the front surface of the anamorphic lens 30, "2" denotes the rear surface of the anamorphic lens 30, "3" denotes each reflecting surface 51 of the polygon mirror 50, "4" denotes the first surface 71 of the fθ optical element 70, "5" denotes the second surface 72 of the fθ optical element 70, "6" denotes the first surface 71 again (surface numbers 4 and 6 denote the same surface).

TABLE 1

| SCAN COEFFICIENT: 135.5 | | SCAN WIDTH: 216 mm | | |
|---|---|---|---|---|
| Surface Number | ry | rz | d | n |
| 1 | −72.000 | 55.424 | 2.00 | 1.48617 |
| 2 | ∞ | | 113.00 | |
| 3 | ∞ | | 50.00 | |
| 4 | −468.924 | −28897.328 | 5.00 | 1.51921 |
| 5 | −264.636 | (Table 3) | 5.00 | 1.51921 |
| 6 | −468.924 | −28897.328 | 109.99 | |

The shape of the first surface 71 of the fθ optical element 70 (surface numbers 4 and 6) on a cross section containing a predetermined origin and parallel to the main scanning direction and the reference axis is defined in terms of a SAG amount X(Y) from a "reference plane" (a plane tangential to the first surface 71 at the origin) as a function of the coordinate Y in the main scanning direction, as shown in the following equation (8):

$$X(Y) = \frac{Y^2}{ry\left(1 + \sqrt{1 - (1+\kappa)Y^2/ry^2}\right)} + \Sigma AM_p Y^p \quad (8)$$

where "ry" denotes the curvature radius in the main scanning direction at the origin, "κ" denotes a conical coefficient (0 in each example), and "$AM_p$" denotes an aspherical coefficient of the p-th order.

The sectional form of the first surface 71 in the auxiliary scanning direction is a circular arc, and curvature Cz(Y) of the arc at the height Y in the main scanning direction is defined by the following equation (9):

$$Cz(Y) = Cz_0 + \Sigma AS_q Y^q \quad (9)$$

where "$Cz_0$" denotes curvature in the auxiliary scanning direction at the origin and "$AS_q$" denotes a curvature coefficient of the q-th order. The coefficients $AM_p$ and $AS_q$ of the equations (8) and (9) defining the first surface 71 will be shown in the following Table 2.

Incidentally, a curvature radius of the first surface 71 in the auxiliary scanning direction at the origin is −28897.328, and the curvature $Cz_0$ in the auxiliary scanning direction at the origin is obtained as the inverse of the curvature radius. In the first example, the coefficients $AM_p$ and $AS_q$ with odd orders p and q have nonzero values, and the shape of the first surface 71 is asymmetric with respect to the origin both in the main scanning direction and in the auxiliary scanning direction.

TABLE 2

| FIRST SURFACE 71 | | |
|---|---|---|
| p, q | $AM_p$ | $AS_q$ |
| 1 | 0.00000 | 0.00000 |
| 2 | −3.73141 × 10$^{-5}$ | 2.69081 × 10$^{-7}$ |
| 3 | 1.71003 × 10$^{-7}$ | −3.82345 × 10$^{-9}$ |
| 4 | −3.54173 × 10$^{-9}$ | −1.02774 × 10$^{-10}$ |
| 5 | 2.97169 × 10$^{-10}$ | −1.69583 × 10$^{-12}$ |

TABLE 2-continued

| FIRST SURFACE 71 | | |
|---|---|---|
| p, q | $AM_p$ | $AS_q$ |
| 6 | −3.15485 × 10$^{-11}$ | −2.50967 × 10$^{-13}$ |
| 7 | 0.00000 | 2.90283 × 10$^{-16}$ |
| 8 | 2.63127 × 10$^{-18}$ | 2.82120 × 10$^{-16}$ |
| 9 | 0.00000 | 0.00000 |
| 10 | −3.24072 × 10$^{-20}$ | 1.24960 × 10$^{-20}$ |
| 11 | 0.00000 | 0.00000 |
| 12 | −5.80643 × 10$^{-23}$ | −8.11413 × 10$^{-24}$ |

The shape of the second surface 72 of the fθ optical element 70 is defined in terms of a SAG amount X(Y, Z) from a reference plane (a plane tangential to the second surface 72 at its origin) as a function of two-dimensional coordinates (Y, Z) on the reference plane in the main scanning direction and the auxiliary scanning direction.

Specifically, the second surface 72 is expressed in terms of the SAG amount X(Y, Z) of each point (Y, Z) on the reference plane (Y: height in the main scanning direction, Z: height in the auxiliary scanning direction), by the following two-dimensional polynomial (10):

$$X(Y, Z) = \frac{Y^2 + Z^2}{ry\left(1 + \sqrt{1 - (1+\kappa)(Y^2 + Z^2)/ry^2}\right)} + \Sigma B_{mn} Y^m Z^n \quad (10)$$

where "ry" denotes the curvature radius in the main scanning direction at the origin, "κ" denotes a conical coefficient (0 in each example), and "$B_{mn}$" denotes an aspherical coefficient of the m-th and n-th orders.

The two-dimensional polynomial (10) is a general formula representing a curved optical surface that is rotationally asymmetric. The coefficients $B_{mn}$ employed in the first example will be shown in the following Table 3, wherein the numbers "m" and "n" are orders regarding the main scanning direction (Y direction) and the auxiliary scanning direction (Z direction) respectively. In the following examples, the order m ranges between 0 and 12, while the order n ranges between 0 and 3.

Incidentally, coefficients $B_{mn}$ with n=0 specify the shape in the main scanning direction, coefficients $B_{mn}$ with n=1 specify the inclination in the auxiliary scanning direction, and coefficients $B_{mn}$ with n=2 specify the curvature in the auxiliary scanning direction. In the first example, coefficients $B_{mn}$ of odd orders m have nonzero values for all n (n=0, 1, 2, 3), and the shape of the second surface 72 is asymmetric with respect to the origin both in the main scanning direction and in the auxiliary scanning direction.

TABLE 3

| SECOND SURFACE 72 | | | | |
|---|---|---|---|---|
| $B_{mn}$ | n = 0 | n = 1 | n = 2 | n = 3 |
| m = 0 | 0.00000 | 0.00000 | −2.16830 × 10$^{-03}$ | 3.51970 × 10$^{-07}$ |
| m = 1 | 0.00000 | 0.00000 | 9.46890 × 10$^{-07}$ | 7.19850 × 10$^{-09}$ |
| m = 2 | 0.00000 | 8.09910 × 10$^{-07}$ | 2.28630 × 10$^{-07}$ | 2.48750 × 10$^{-10}$ |
| m = 3 | −2.37560 × 10$^{-07}$ | −5.53890 × 10$^{-10}$ | −8.40050 × 10$^{-10}$ | 9.02810 × 10$^{-13}$ |

TABLE 3-continued

SECOND SURFACE 72

| $B_{mn}$ | n = 0 | n = 1 | n = 2 | n = 3 |
|---|---|---|---|---|
| m = 4 | $3.02710 \times 10^{-08}$ | $-7.90340 \times 10^{-10}$ | $3.02480 \times 10^{-11}$ | $-5.39260 \times 10^{-13}$ |
| m = 5 | $1.88540 \times 10^{-10}$ | $-2.50030 \times 10^{-13}$ | $7.46030 \times 10^{-14}$ | 0.00000 |
| m = 6 | $-1.06640 \times 10^{-11}$ | $7.19870 \times 10^{-13}$ | $-1.17620 \times 10^{-13}$ | 0.00000 |
| m = 7 | 0.00000 | $1.03700 \times 10^{-16}$ | $-3.48940 \times 10^{-16}$ | 0.00000 |
| m = 8 | $-1.33710 \times 10^{-15}$ | $-2.68150 \times 10^{-16}$ | $8.72560 \times 10^{-17}$ | 0.00000 |
| m = 9 | 0.00000 | $-4.09330 \times 10^{-20}$ | $5.50600 \times 10^{-20}$ | 0.00000 |
| m = 10 | $2.37640 \times 10^{-19}$ | $3.98870 \times 10^{-20}$ | $-8.13000 \times 10^{-21}$ | |
| m = 11 | 0.00000 | 0.00000 | | |
| m = 12 | $-4.02280 \times 10^{-23}$ | | | |

Incidentally, the first surface 71 and the second surface 72 defined by the above coefficients are tilted with respect to the reference axis (so that the intersection angle between the reference axis and each surface will be off of 90 degrees) in regard to the auxiliary scanning direction, and the origin of each surface 71, 72 (origin of the two-dimensional coordinates when each surface is defined by each equation) is shifted from the reference axis in the main scanning direction. The "tilt" is expressed by the angle [degrees] between the reference axis and a normal line to the origin of each surface. The sign of the tilt is negative when each surface is tilted clockwise in FIG. 4. The "shift" is expressed by deviation [mm] of the origin of each surface from the reference axis measured in the main scanning direction. The sign of the shift is negative when each surface is shifted toward the light source unit (downward in FIG. 3). Specific data of the tilt and the shift will be shown in the following Table 4.

TABLE 4

| | TILT REGARDING AUXILIARY SCANNING DIRECTION | SHIFT IN MAIN SCANNING DIRECTION |
|---|---|---|
| FIRST SURFACE 71 | −0.801° | −0.692 |
| SECOND SURFACE 72 | −1.648° | −1.215 |

As above, each of the first and second surfaces 71 and 72 of the fθ optical element 70 in the first example is asymmetric with respect to its origin both in the main scanning direction and in the auxiliary scanning direction and the origin of each surface 71, 72 is shifted from the reference axis in the main scanning direction. Therefore, each surface 71, 72 is asymmetric both in the main scanning direction and in the auxiliary scanning direction also with respect to the reference axis.

FIGS. 5A through 5C are graphs showing optical performance of the reflective scanning optical system of the first example, in which FIG. 5A shows fθ error (deviation of the beam spot on the scan target surface from an ideal position), FIG. 5B shows curvature of field (i.e., deviation of focusing position from the scan target surface measured in the optical axis direction) regarding the main scanning direction (broken line) and the auxiliary scanning direction (solid line), and FIG. 5C shows scan line curvature (displacement of the scan line in the auxiliary scanning direction).

In each graph, the vertical axis represents image height [mm] (distance from the scan center on the photosensitive drum 60 measured in the main scanning direction), and the horizontal axis represents the amount of each aberration [mm]. Incidentally, the origin of each graph (FIGS. 5A–5C) in the main scanning direction is shifted from the reference axis by Δy [mm] (see FIG. 3), and the origin of the graph of the scan line curvature (FIG. 5C) in the auxiliary scanning direction is set at a point that is shifted from the reference axis by Δz [mm] (see FIG. 4). In the first example, Δy=−2.182 and Δz=12.000.

SECOND EXAMPLE

The following Table 5 shows specific numerical configuration of each optical surface of a reflective scanning optical system according to a second example of the embodiment. The surface numbers in Table 5 denote the same optical surfaces as in the first example. Since the arrangement of the optical elements is the same as that of the first example, explanatory drawings for the configuration of the second example are omitted.

TABLE 5

| SCAN COEFFICIENT: 135.5 | | SCAN WIDTH: 216 mm | | |
|---|---|---|---|---|
| Surface Number | ry | rz | d | n |
| 1 | −72.000 | 55.424 | 2.00 | 1.48617 |
| 2 | ∞ | | 113.00 | |
| 3 | ∞ | | 50.00 | |
| 4 | −469.513 | −18426.864 | 5.00 | 1.51921 |
| 5 | −264.698 | (Table 7) | 5.00 | 1.51921 |
| 6 | −469.513 | −18426.864 | 109.99 | |

The first surface 71 of the fθ optical element 70 included in the reflective scanning optical system of the second example is an anamorphic aspherical surface similarly to the first example. Thus, the shape of the first surface 71 on the cross section containing the origin and parallel to the main scanning direction and the reference axis is defined by the equation (8) in terms of the SAG amount X(Y) from the reference plane, and the curvature of the arc as the sectional form in the auxiliary scanning direction is expressed by the equation (9). The coefficients of the equations (8) and (9) will be shown in the following Table 6. In the second example, the coefficients $AM_p$ and $AS_q$ with odd orders p and q have nonzero values, and thus the shape of the first surface 71 is asymmetric with respect to the origin both in the main scanning direction and in the auxiliary scanning direction.

TABLE 6

FIRST SURFACE 71

| p, q | $AM_p$ | $AS_q$ |
|---|---|---|
| 1 | 0.00000 | 0.00000 |
| 2 | $-3.73141 \times 10^{-5}$ | $2.60485 \times 10^{-7}$ |
| 3 | $1.71003 \times 10^{-7}$ | $-3.91107 \times 10^{-9}$ |
| 4 | $-3.77558 \times 10^{-9}$ | $-5.13898 \times 10^{-11}$ |
| 5 | $2.98028 \times 10^{-10}$ | $-1.73138 \times 10^{-12}$ |
| 6 | $-3.14355 \times 10^{-11}$ | $-2.46333 \times 10^{-13}$ |
| 7 | 0.00000 | $2.77493 \times 10^{-16}$ |
| 8 | $-2.22465 \times 10^{-17}$ | $2.80854 \times 10^{-16}$ |

TABLE 6-continued

FIRST SURFACE 71

| p, q | $AM_p$ | $AS_q$ |
|---|---|---|
| 9 | 0.00000 | 0.00000 |
| 10 | $-3.80788 \times 10^{-20}$ | $1.24142 \times 10^{-20}$ |
| 11 | 0.00000 | 0.00000 |
| 12 | $-5.68418 \times 10^{-23}$ | $-7.79787 \times 10^{-24}$ |

The second surface 72 of the fθ optical element 70 in the second example is expressed by the aforementioned two-dimensional polynomial (10). The coefficients $B_{mn}$ of the polynomial will be shown in the following Table 7. In the second example, coefficients $B_{mn}$ of odd orders m have nonzero values for n=0, 1, 2 and the shape of the second surface 72 is asymmetric with respect to the origin both in the main scanning direction and in the auxiliary scanning direction.

TABLE 7

SECOND SURFACE 72

| $B_{mn}$ | n = 0 | n = 1 | n = 2 | n = 3 |
|---|---|---|---|---|
| m = 0 | 0.00000 | 0.00000 | $-2.17180 \times 10^{-03}$ | $3.75930 \times 10^{-07}$ |
| m = 1 | 0.00000 | 0.00000 | $9.50590 \times 10^{-07}$ | $8.28260 \times 10^{-09}$ |
| m = 2 | 0.00000 | $8.20760 \times 10^{-07}$ | $2.25930 \times 10^{-07}$ | $1.53560 \times 10^{-10}$ |
| m = 3 | $-2.36990 \times 10^{-07}$ | $-3.13600 \times 10^{-09}$ | $-8.73380 \times 10^{-10}$ | $1.34290 \times 10^{-12}$ |
| m = 4 | $3.02600 \times 10^{-08}$ | $-7.95070 \times 10^{-10}$ | $4.08940 \times 10^{-11}$ | $-5.41030 \times 10^{-13}$ |
| m = 5 | $1.88750 \times 10^{-10}$ | $1.34640 \times 10^{-12}$ | $6.35800 \times 10^{-14}$ | 0.00000 |
| m = 6 | $-1.06680 \times 10^{-11}$ | $7.28650 \times 10^{-13}$ | $-1.18680 \times 10^{-13}$ | 0.00000 |
| m = 7 | 0.00000 | $-2.30530 \times 10^{-16}$ | $-3.47790 \times 10^{-16}$ | 0.00000 |
| m = 8 | $-1.33950 \times 10^{-15}$ | $-2.72170 \times 10^{-16}$ | $8.76680 \times 10^{-17}$ | 0.00000 |
| m = 9 | 0.00000 | $-2.74980 \times 10^{-20}$ | $5.33880 \times 10^{-20}$ | 0.00000 |
| m = 10 | $2.37420 \times 10^{-19}$ | $4.07360 \times 10^{-20}$ | $-7.99340 \times 10^{-21}$ | |
| m = 11 | 0.00000 | 0.00000 | | |
| m = 12 | $-4.02820 \times 10^{-23}$ | | | |

The first and second surfaces 71 and 72 of the fθ optical element 70 are tilted with respect to the reference axis (so that the intersection angle between the reference axis and each surface will be off of 90 degrees) in regard to the auxiliary scanning direction, and the origin of each surface 71, 72 is shifted from the reference axis in the main scanning direction. Specific data of the tilt and the shift will be shown in the following Table 8.

TABLE 8

| | TILT REGARDING AUXILIARY SCANNING DIRECTION | SHIFT IN MAIN SCANNING DIRECTION |
|---|---|---|
| FIRST SURFACE 71 | -0.695° | -0.694 |
| SECOND SURFACE 72 | -1.613° | -1.215 |

As above, each of the first and second surfaces 71 and 72 of the fθ optical element 70 in the second example is asymmetric with respect to its origin both in the main scanning direction and in the auxiliary scanning direction and the origin of each surface 71, 72 is shifted from the reference axis in the main scanning direction. Therefore, each surface 71, 72 is asymmetric both in the main scanning direction and in the auxiliary scanning direction also with respect to the reference axis.

FIGS. 6A through 6C are graphs showing optical performance of the reflective scanning optical system of the second example, in which FIG. 6A shows fθ error, FIG. 6B shows curvature of field, and FIG. 6C shows scan line curvature. In the second example, the shift Δy [mm] of the origin of each graph (FIGS. 6A–6C) from the reference axis in the main scanning direction and the shift Δz [mm] of the origin of the graph of the scan line curvature (FIG. 6C) from the reference axis in the auxiliary scanning direction are Δy=−2.181 and Δz=12.000.

THIRD EXAMPLE

The following Table 9 shows specific numerical configuration of each optical surface of a reflective scanning optical system in accordance with a third example of the embodiment. The surface numbers in Table 9 denote the same optical surfaces as in the first example. Explanatory drawings for a configuration of the third example are omitted since the same optical element arrangement as that of the first example is employed.

TABLE 9

| SCAN COEFFICIENT: 135.5 | | SCAN WIDTH: 216 mm | | |
|---|---|---|---|---|
| Surface Number | ry | rz | d | n |
| 1 | -72.000 | 55.424 | 2.00 | 1.48617 |
| 2 | ∞ | | 113.00 | |
| 3 | ∞ | | 50.00 | |
| 4 | -448.048 | -4000.000 | 5.00 | 1.51921 |
| 5 | -262.314 | (Table 11) | 5.00 | 1.51921 |
| 6 | -448.048 | -4000.000 | 109.93 | |

The first surface 71 of the fθ optical element 70 included in the reflective scanning optical system of the third example is an anamorphic aspherical surface similarly to the first example, and thus the shape of the first surface 71 on the cross section containing the origin and parallel to the main scanning direction and the reference axis is defined by the equation (8) in terms of the SAG amount X(Y) from the reference plane, and the curvature of the arc as the sectional form in the auxiliary scanning direction is expressed by the equation (9).

The coefficients of the equations (8) and (9) will be shown in the following Table 10. In the third example, the shape of the first surface 71 is asymmetric with respect to the origin in the main scanning direction since the coefficients $AM_p$ with odd orders p have nonzero values, while the shape of the first surface 71 is symmetric with respect to the origin in the auxiliary scanning direction since the coefficients $AS_q$ with odd orders q are 0.

TABLE 10

| | FIRST SURFACE 71 | |
|---|---|---|
| p, q | $AM_p$ | $AS_q$ |
| 1 | 0.00000 | 0.00000 |
| 2 | $-3.94712 \times 10^{-5}$ | $2.84994 \times 10^{-8}$ |
| 3 | $-4.81150 \times 10^{-7}$ | 0.00000 |
| 4 | $-5.06845 \times 10^{-11}$ | $-1.18666 \times 10^{-11}$ |
| 5 | $5.35327 \times 10^{-10}$ | 0.00000 |
| 6 | $-2.94353 \times 10^{-11}$ | $-3.84612 \times 10^{-15}$ |
| 7 | 0.00000 | 0.00000 |
| 8 | $-7.50086 \times 10^{-18}$ | $1.75081 \times 10^{-16}$ |
| 9 | 0.00000 | 0.00000 |
| 10 | $-2.79898 \times 10^{-21}$ | 0.00000 |
| 11 | 0.00000 | 0.00000 |
| 12 | $2.31234 \times 10^{-25}$ | 0.00000 |

The second surface 72 of the fθ optical element 70 in the third example is expressed by the aforementioned two-dimensional polynomial (10). The coefficients $B_{mn}$ of the polynomial will be shown in the following Table 11. In the third example, the shape of the second surface 72 is asymmetric with respect to the origin in the main scanning direction since coefficients $B_{mn}$ of odd orders m have nonzero values for n=0. Meanwhile, coefficients $B_{mn}$ of odd orders m are all 0 for n=1 and have nonzero values for n=2, therefore, the inclination in the auxiliary scanning direction is symmetric with respect to the origin in the main scanning direction while the curvature in the auxiliary scanning direction is asymmetric with respect to the origin in the main scanning direction.

| | SECOND SURFACE 72 | | | |
|---|---|---|---|---|
| $B_{mn}$ | n = 0 | n = 1 | n = 2 | n = 3 |
| m = 0 | 0.00000 | 0.00000 | $-2.18240 \times 10^{-03}$ | 0.00000 |
| m = 1 | 0.00000 | 0.00000 | $8.14980 \times 10^{-07}$ | 0.00000 |
| m = 2 | 0.00000 | $9.37750 \times 10^{-07}$ | $1.25890 \times 10^{-07}$ | 0.00000 |
| m = 3 | $-4.98720 \times 10^{-07}$ | 0.00000 | $-1.79870 \times 10^{-10}$ | 0.00000 |
| m = 4 | $3.13360 \times 10^{-08}$ | $-1.00250 \times 10^{-09}$ | $1.92660 \times 10^{-10}$ | 0.00000 |
| m = 5 | $2.39230 \times 10^{-10}$ | 0.00000 | 0.00000 | 0.00000 |
| m = 6 | $-1.00490 \times 10^{-11}$ | $8.67810 \times 10^{-13}$ | $-2.10490 \times 10^{-13}$ | 0.00000 |
| m = 7 | 0.00000 | 0.00000 | 0.00000 | 0.00000 |
| m = 8 | $-1.35900 \times 10^{-15}$ | $-3.13050 \times 10^{-16}$ | $1.12630 \times 10^{-16}$ | 0.00000 |
| m = 9 | 0.00000 | 0.00000 | 0.00000 | 0.00000 |
| m = 10 | $3.02740 \times 10^{-19}$ | $4.47540 \times 10^{-20}$ | $-1.05670 \times 10^{-20}$ | |
| m = 11 | 0.00000 | 0.00000 | | |
| m = 12 | $-2.94560 \times 10^{-23}$ | | | |

The first and second surfaces 71 and 72 of the fθ optical element 70 are tilted with respect to the reference axis (so that the intersection angle will be off of 90 degrees) in regard to the auxiliary scanning direction, and the origin of each surface 71, 72 is shifted from the reference axis in the main scanning direction. Specific data of the tilt and the shift will be shown in the following Table 12.

TABLE 12

| | TILT REGARDING AUXILIARY SCANNING DIRECTION | SHIFT IN MAIN SCANNING DIRECTION |
|---|---|---|
| FIRST SURFACE 71 | $-0.861°$ | $-1.411$ |
| SECOND SURFACE 72 | $-1.665°$ | $-1.499$ |

As above, the first surface 71 of the fθ optical element 70 in the third example is asymmetric with respect to its origin in the main scanning direction and symmetric with respect to the origin in the auxiliary scanning direction, and the origin is shifted from the reference axis in the main scanning direction. Therefore, the first surface 71 is asymmetric in the main scanning direction and symmetric in the auxiliary scanning direction also with respect to the reference axis.

The second surface 72 is asymmetric with respect to the origin both in the main scanning direction and in the auxiliary scanning direction, and the origin is shifted from the reference axis in the main scanning direction. Therefore, the second surface 72 is asymmetric both in the main scanning direction and in the auxiliary scanning direction also with respect to the reference axis.

Figures 7A, 7B, 7C:
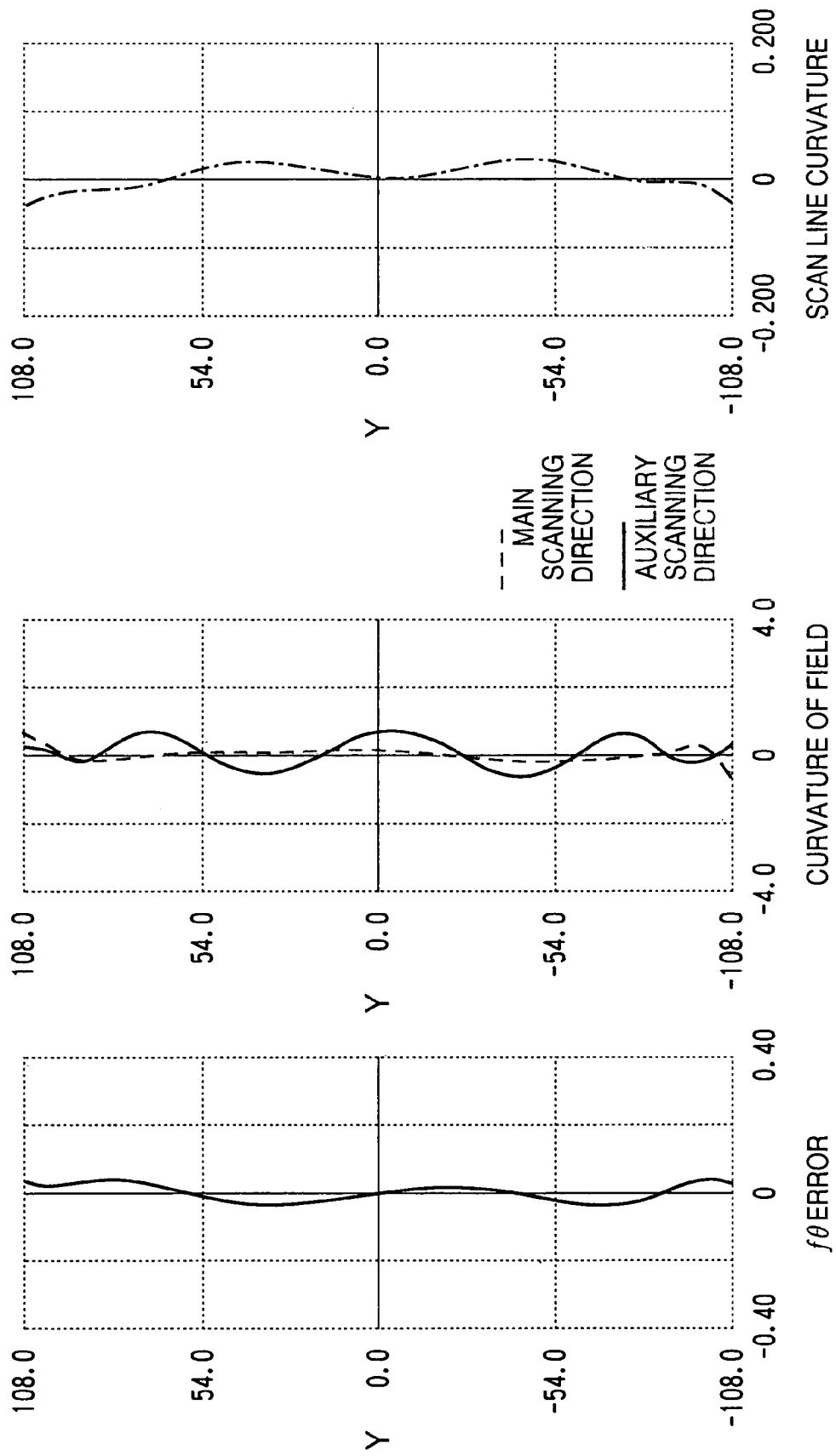
FIGS. 7A through 7C are graphs showing the aberrations of a reflective scanning optical system of a third example of the embodiment.
Figure 11:
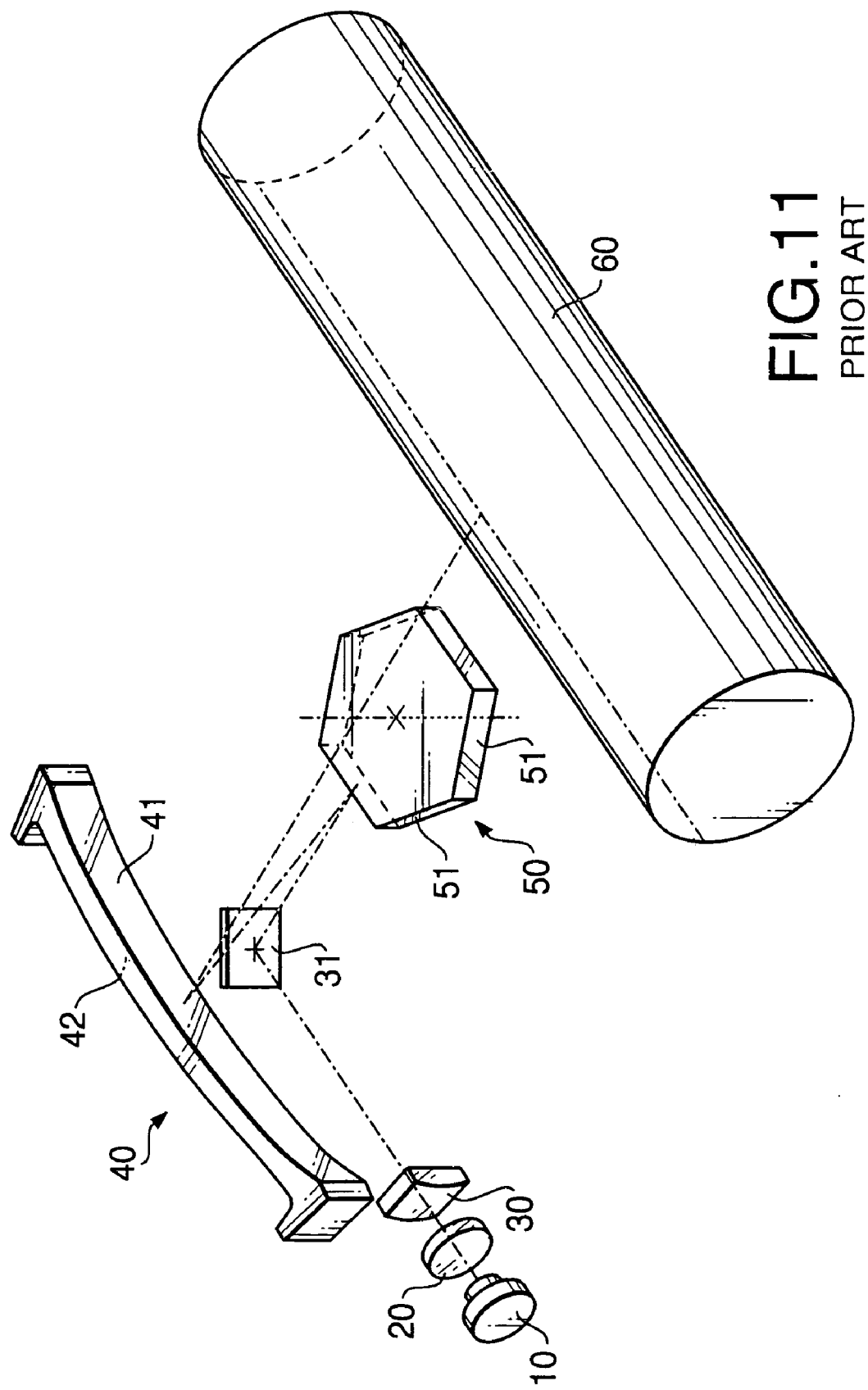
FIG. 11 is a perspective view showing the overall composition of a conventional reflective scanning optical system.
Figure 12:
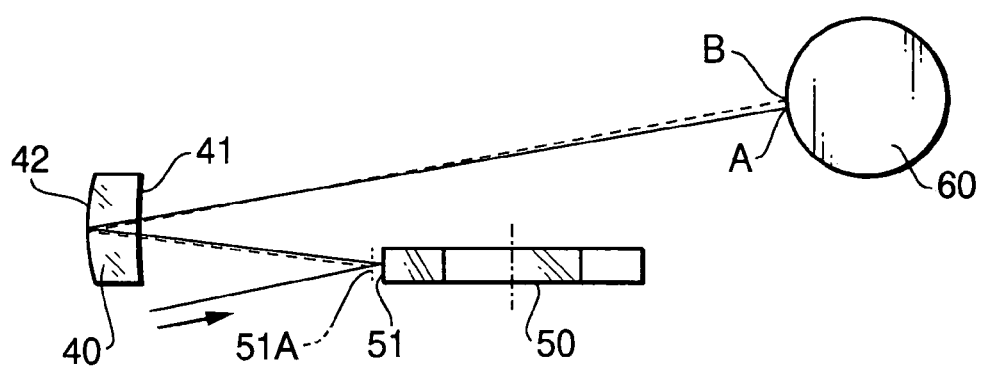
FIG. 12 is an explanatory drawing of the reflective scanning optical system of FIG. 11 seen in the main scanning direction.

FIGS. 7A through 7C are graphs showing optical performance of the reflective scanning optical system of the third example, in which FIG. 7A shows fθ error, FIG. 7B shows field curvature, and FIG. 7C shows scan line curvature. In the third example, the shift Δy [mm] of the origin of each graph (FIGS. 7A–7C) from the reference axis in the main scanning direction and the shift Δz [mm] of the origin of the graph of the scan line curvature (FIG. 7C) from the reference axis in the auxiliary scanning direction are Δy=−2.454 and Δz=12.000.

FOURTH EXAMPLE

The following Table 13 shows specific numerical configuration of each optical surface of a reflective scanning optical system in accordance with a fourth example of the embodiment. The surface numbers in Table 13 denote the same optical surfaces as in the first example. Explanatory drawings for the fourth example are omitted since the same optical element arrangement as that of the first example is employed.

TABLE 13

| SCAN COEFFICIENT: 135.5 | | SCAN WIDTH: 216 mm | | |
|---|---|---|---|---|
| Surface Number | ry | rz | d | n |
| 1 | $-72.000$ | 55.424 | 2.00 | 1.48617 |
| 2 | ∞ | | 113.00 | |
| 3 | ∞ | | 50.00 | |
| 4 | $-529.940$ | $-4000.000$ | 5.00 | 1.51921 |
| 5 | $-270.474$ | (Table 15) | 5.00 | 1.51921 |
| 6 | $-529.940$ | $-4000.000$ | 110.00 | |

The first surface 71 of the fθ optical element 70 included in the reflective scanning optical system of the fourth example is an anamorphic aspherical surface similarly to the first example, and thus the shape of the first surface 71 on the cross section containing the origin and parallel to the main scanning direction and the reference axis is defined by the equation (8) in terms of the SAG amount X(Y) from the reference plane and the curvature of the arc as the sectional form in the auxiliary scanning direction is expressed by the equation (9). The coefficients of the equations (8) and (9) will be shown in the following Table 14. In the fourth example, the coefficients $AM_p$, $AS_q$ with odd orders p and q are all 0, and thus the shape of the first surface 71 is symmetric with respect to the origin both in the main scanning direction and in the auxiliary scanning direction.

TABLE 14

FIRST SURFACE 71

| p, q | $AM_p$ | $AS_q$ |
|---|---|---|
| 1 | 0.00000 | 0.00000 |
| 2 | $-3.79213 \times 10^{-5}$ | $2.86568 \times 10^{-8}$ |
| 3 | 0.00000 | 0.00000 |
| 4 | $-5.36402 \times 10^{-11}$ | $-1.17442 \times 10^{-11}$ |
| 5 | 0.00000 | 0.00000 |
| 6 | $-4.69120 \times 10^{-11}$ | $-3.78697 \times 10^{-15}$ |
| 7 | 0.00000 | 0.00000 |
| 8 | $-8.46289 \times 10^{-18}$ | $1.77345 \times 10^{-16}$ |
| 9 | 0.00000 | 0.00000 |
| 10 | $-6.06757 \times 10^{-21}$ | 0.00000 |
| 11 | 0.00000 | 0.00000 |
| 12 | $2.29869 \times 10^{-25}$ | 0.00000 |

The second surface 72 of the fθ optical element 70 in the fourth example is expressed by the aforementioned two-dimensional polynomial (10). The coefficients $B_{mn}$ of the polynomial will be shown in the following Table 15. In the fourth example, the shape of the second surface 72 is asymmetric with respect to the origin in the main scanning direction since coefficients $B_{mn}$ of odd orders m have nonzero values for n=0. Meanwhile, coefficients $B_{mn}$ of odd orders m are all 0 for n=1 and have nonzero values for n=2, therefore, the inclination in the auxiliary scanning direction is symmetric with respect to the origin in the main scanning direction while the curvature in the auxiliary scanning direction is asymmetric with respect to the origin in the main scanning direction.

TABLE 15

SECOND SURFACE 72

| $B_{mn}$ | n = 0 | n = 1 | n = 2 | n = 3 |
|---|---|---|---|---|
| m = 0 | 0.00000 | 0.00000 | $-2.23980 \times 10^{-03}$ | 0.00000 |
| m = 1 | 0.00000 | 0.00000 | $6.42200 \times 10^{-07}$ | 0.00000 |
| m = 2 | 0.00000 | $9.63560 \times 10^{-07}$ | $1.34990 \times 10^{-07}$ | 0.00000 |
| m = 3 | $-3.37070 \times 10^{-07}$ | 0.00000 | $-1.59810 \times 10^{-10}$ | 0.00000 |
| m = 4 | $3.34120 \times 10^{-08}$ | $-1.10170 \times 10^{-09}$ | $1.90040 \times 10^{-10}$ | 0.00000 |
| m = 5 | $3.93690 \times 10^{-11}$ | 0.00000 | 0.00000 | 0.00000 |
| m = 6 | $-1.60090 \times 10^{-11}$ | $9.60450 \times 10^{-13}$ | $-2.13720 \times 10^{-13}$ | 0.00000 |
| m = 7 | 0.00000 | 0.00000 | 0.00000 | 0.00000 |
| m = 8 | $-1.67940 \times 10^{-15}$ | $-3.46630 \times 10^{-16}$ | $1.15890 \times 10^{-16}$ | 0.00000 |
| m = 9 | 0.00000 | 0.00000 | 0.00000 | 0.00000 |
| m = 10 | $3.11620 \times 10^{-19}$ | $4.91770 \times 10^{-20}$ | $-1.12480 \times 10^{-20}$ | |
| m = 11 | 0.00000 | 0.00000 | | |
| m = 12 | $-2.37680 \times 10^{-23}$ | | | |

The first and second surfaces 71 and 72 of the fθ optical element 70 are tilted with respect to the reference axis (so that the intersection angle will be off of 90 degrees) in regard to the auxiliary scanning direction, and the origin of each surface 71, 72 is shifted from the reference axis in the main scanning direction. Specific data of the tilt and the shift will be shown in the following Table 16.

TABLE 16

| | TILT REGARDING AUXILIARY SCANNING DIRECTION | SHIFT IN MAIN SCANNING DIRECTION |
|---|---|---|
| FIRST SURFACE 71 | $-0.809°$ | $-1.781$ |
| SECOND SURFACE 72 | $-1.647°$ | $-1.803$ |

As above, the first surface 71 of the fθ optical element 70 in the fourth example is symmetric with respect to its origin both in the main scanning direction and in the auxiliary scanning direction, and the origin is shifted from the reference axis in the main scanning direction. Therefore, with respect to the reference axis, the first surface 71 is asymmetric in the main scanning direction and symmetric in the auxiliary scanning direction. Meanwhile, the second surface 72 is asymmetric with respect to its origin both in the main scanning direction and in the auxiliary scanning direction, and the origin is shifted from the reference axis in the main scanning direction. Therefore, the second surface 72 is asymmetric both in the main scanning direction and in the auxiliary scanning direction also with respect to the reference axis.

FIGS. 8A through 8C are graphs showing optical performance of the reflective scanning optical system of the fourth example, in which FIG. 8A shows fθ error, FIG. 8B shows field curvature, and FIG. 8C shows scan line curvature. In the fourth example, the shift Δy [mm] of the origin of each graph (FIGS. 8A–8C) from the reference axis in the main scanning direction and the shift Δz [mm] of the origin of the graph of the scan line curvature (FIG. 8C) from the reference axis in the auxiliary scanning direction are Δy=−2.888 and Δz=12.000.

FIFTH EXAMPLE

The following Table 17 shows specific numerical configuration of each optical surface of a reflective scanning optical system in accordance with a fifth example of the embodiment. The surface numbers in Table 17 denote the same optical surfaces as in the first example. Explanatory drawings of a configuration of the fifth example are omitted here since the same optical element arrangement as that of the first example is employed.

TABLE 17

| SCAN COEFFICIENT: 135.5 | | SCAN WIDTH: 216 mm | | |
|---|---|---|---|---|
| Surface Number | ry | rz | d | n |
| 1 | −72.000 | 55.424 | 2.00 | 1.48617 |
| 2 | ∞ | | 113.00 | |
| 3 | ∞ | | 50.00 | |
| 4 | −534.291 | −4000.000 | 5.00 | 1.51921 |
| 5 | −270.848 | (Table 19) | 5.00 | 1.51921 |
| 6 | −534.291 | −4000.000 | 110.00 | |

The first surface 71 of the fθ optical element 70 included in the reflective scanning optical system of the fifth example is an anamorphic aspherical surface similarly to the first example, and thus the shape of the first surface 71 on the cross section containing the origin and parallel to the main scanning direction and the reference axis is defined by the equation (8) in terms of the SAG amount X(Y) from the reference plane and the curvature of the arc as the sectional form in the auxiliary scanning direction is expressed by the equation (9). The coefficients of the equations (8) and (9) will be shown in the following Table 18. In the fifth example, the coefficients $AM_p$ and $AS_q$ with odd orders p and q are all 0, and thus the shape of the first surface 71 is symmetric with respect to the origin both in the main scanning direction and in the auxiliary scanning direction.

TABLE 18

FIRST SURFACE 71

| p, q | $AM_p$ | $AS_q$ |
|---|---|---|
| 1 | 0.00000 | 0.00000 |
| 2 | $-3.79620 \times 10^{-5}$ | $2.86886 \times 10^{-8}$ |
| 3 | 0.00000 | 0.00000 |
| 4 | $-5.41374 \times 10^{-11}$ | $-1.17075 \times 10^{-11}$ |
| 5 | 0.00000 | 0.00000 |
| 6 | $-4.85931 \times 10^{-11}$ | $-3.79381 \times 10^{-15}$ |
| 7 | 0.00000 | 0.00000 |
| 8 | $-8.66161 \times 10^{-18}$ | $1.77313 \times 10^{-16}$ |
| 9 | 0.00000 | 0.00000 |
| 10 | $-6.65195 \times 10^{-21}$ | 0.00000 |
| 11 | 0.00000 | 0.00000 |
| 12 | $2.32639 \times 10^{-25}$ | 0.00000 |

The second surface 72 of the fθ optical element 70 in the fifth example is expressed by the aforementioned two-dimensional polynomial (10). The coefficients $B_{mn}$ of the polynomial will be shown in the following Table 19. In the fifth example, the shape of the second surface 72 is asymmetric with respect to the origin in the main scanning direction since coefficients $B_{mn}$ of odd orders m have non-zero values for n=0. Meanwhile, coefficients $B_{mn}$ of odd orders m are all 0 for n=1 and have nonzero values for n=2, therefore, the inclination in the auxiliary scanning direction is symmetric with respect to the origin in the main scanning direction while the curvature in the auxiliary scanning direction is asymmetric with respect to the origin in the main scanning direction.

TABLE 19

SECOND SURFACE 72

| $B_{mn}$ | n = 0 | n = 1 | n = 2 | n = 3 |
|---|---|---|---|---|
| m = 0 | 0.00000 | 0.00000 | $-2.24250 \times 10^{-03}$ | 0.00000 |
| m = 1 | 0.00000 | 0.00000 | $6.52530 \times 10^{-07}$ | 0.00000 |
| m = 2 | 0.00000 | $1.01610 \times 10^{-06}$ | $1.36380 \times 10^{-07}$ | 0.00000 |
| m = 3 | $-3.38750 \times 10^{-07}$ | 0.00000 | $-1.93120 \times 10^{-10}$ | 0.00000 |
| m = 4 | $3.35430 \times 10^{-08}$ | $-1.10850 \times 10^{-09}$ | $1.88450 \times 10^{-10}$ | 0.00000 |
| m = 5 | $4.12310 \times 10^{-11}$ | 0.00000 | 0.00000 | 0.00000 |
| m = 6 | $-1.66190 \times 10^{-11}$ | $9.68630 \times 10^{-13}$ | $-2.14030 \times 10^{-13}$ | 0.00000 |
| m = 7 | 0.00000 | 0.00000 | 0.00000 | 0.00000 |
| m = 8 | $-1.70080 \times 10^{-15}$ | $-3.50200 \times 10^{-16}$ | $1.16490 \times 10^{-16}$ | 0.00000 |
| m = 9 | 0.00000 | 0.00000 | 0.00000 | 0.00000 |
| m = 10 | $3.13880 \times 10^{-19}$ | $4.93590 \times 10^{-20}$ | $-1.13890 \times 10^{-20}$ | |
| m = 11 | 0.00000 | 0.00000 | | |
| m = 12 | $-2.34150 \times 10^{-23}$ | | | |

The first and second surfaces 71 and 72 of the fθ optical element 70 are tilted with respect to the reference axis (so that the intersection angle will be off of 90 degrees) in regard to the auxiliary scanning direction, and the origin of each surface 71, 72 is shifted from the reference axis in the main scanning direction. Specific data of the tilt and the shift will be shown in the following Table 20.

TABLE 20

| | TILT REGARDING AUXILIARY SCANNING DIRECTION | SHIFT IN MAIN SCANNING DIRECTION |
|---|---|---|
| FIRST SURFACE 71 | $-0.911°$ | $-1.782$ |
| SECOND SURFACE 72 | $-1.680°$ | $-1.820$ |

As above, the first surface 71 of the fθ optical element 70 in the fifth example is symmetric with respect to its origin both in the main scanning direction and in the auxiliary scanning direction, and the origin is shifted from the reference axis in the main scanning direction. Therefore, with respect to the reference axis, the first surface 71 is asymmetric in the main scanning direction and symmetric in the auxiliary scanning direction. Meanwhile, the second surface 72 is asymmetric with respect to its origin both in the main scanning direction and in the auxiliary scanning direction, and the origin is shifted from the reference axis in the main scanning direction. Therefore, the second surface 72 is asymmetric both in the main scanning direction and in the auxiliary scanning direction also with respect to the reference axis.

FIGS. 9A through 9C are graphs showing optical performance of the reflective scanning optical system of the fifth example, in which FIG. 9A shows fθ error, FIG. 9B shows field curvature, and FIG. 9C shows scan line curvature. In the fifth example, the shift Δy [mm] of the origin of each graph (FIGS. 9A–9C) from the reference axis in the main scanning direction and the shift Δz [mm] of the origin of the graph of the scan line curvature (FIG. 9C) from the reference axis in the auxiliary scanning direction are Δy=−2.920 and Δz=12.000.

SIXTH EXAMPLE

The following Table 21 shows specific numerical configuration of each optical surface of a reflective scanning optical system in accordance with a sixth example of the embodiment. The surface numbers in Table 21 denote the same optical surfaces as in the first example. Explanatory drawings for a configuration of the sixth example are omitted here since the same optical element arrangement as that of the first example is employed.

TABLE 21

| SCAN COEFFICIENT: 135.5 | | SCAN WIDTH: 216 mm | | |
|---|---|---|---|---|
| Surface Number | ry | rz | d | n |
| 1 | −72.000 | 55.424 | 2.00 | 1.48617 |
| 2 | ∞ | | 113.00 | |
| 3 | ∞ | | 50.00 | |
| 4 | −569.064 | −4000.000 | 5.00 | 1.51921 |
| 5 | −273.695 | (Table 23) | 5.00 | 1.51921 |
| 6 | −569.064 | −4000.000 | 110.00 | |

The first surface 71 of the fθ optical element 70 included in the reflective scanning optical system of the sixth example is an anamorphic aspherical surface similarly to the first example, and thus the shape of the first surface 71 on the cross section containing the origin and parallel to the main scanning direction and the reference axis is defined by the equation (8) in terms of the SAG amount X(Y) from the reference plane and the curvature of the arc as the sectional form in the auxiliary scanning direction is expressed by the equation (9). The coefficients of the equations (8) and (9) will be shown in the following Table 22. In the sixth example, the coefficients $AM_p$, $AS_q$ with odd orders p and q are all 0, and thus the shape of the first surface 71 is symmetric with respect to the origin both in the main scanning direction and in the auxiliary scanning direction.

TABLE 22

FIRST SURFACE 71

| p, q | $AM_p$ | $AS_q$ |
|---|---|---|
| 1 | 0.00000 | 0.00000 |
| 2 | −3.79175 × 10$^{-5}$ | 2.87222 × 10$^{-8}$ |
| 3 | 0.00000 | 0.00000 |
| 4 | −6.03747 × 10$^{-11}$ | −1.16223 × 10$^{-11}$ |
| 5 | 0.00000 | 0.00000 |
| 6 | −5.41550 × 10$^{-11}$ | −3.85079 × 10$^{-15}$ |
| 7 | 0.00000 | 0.00000 |
| 8 | −9.09249 × 10$^{-18}$ | 1.77634 × 10$^{-16}$ |
| 9 | 0.00000 | 0.00000 |
| 10 | −7.87046 × 10$^{-21}$ | 0.00000 |
| 11 | 0.00000 | 0.00000 |
| 12 | 2.34699 × 10$^{-25}$ | 0.00000 |

The second surface 72 of the fθ optical element 70 in the sixth example is expressed by the aforementioned two-dimensional polynomial (10). The coefficients $B_{mn}$ of the polynomial will be shown in the following Table 23. In the sixth example, the shape of the second surface 72 is asymmetric with respect to the origin in the main scanning direction since coefficients $B_{mn}$ of odd orders m have nonzero values for n=0. Meanwhile, coefficients $B_{mn}$ of odd orders m are all 0 for n=1 and have nonzero values for n=2, therefore, the inclination in the auxiliary scanning direction is symmetric with respect to the origin in the main scanning direction while the curvature in the auxiliary scanning direction is asymmetric with respect to the origin in the main scanning direction.

TABLE 23

SECOND SURFACE 72

| $B_{mn}$ | n = 0 | n = 1 | n = 2 | n = 3 |
|---|---|---|---|---|
| m = 0 | 0.00000 | 0.00000 | −2.26240 × 10$^{-03}$ | 0.00000 |
| m = 1 | 0.00000 | 0.00000 | 6.83570 × 10$^{-07}$ | 0.00000 |
| m = 2 | 0.00000 | 1.42210 × 10$^{-06}$ | 1.45440 × 10$^{-07}$ | 0.00000 |
| m = 3 | −3.40280 × 10$^{-07}$ | 0.00000 | −2.43030 × 10$^{-10}$ | 0.00000 |
| m = 4 | 3.35300 × 10$^{-08}$ | −1.45280 × 10$^{-09}$ | 1.79490 × 10$^{-10}$ | 0.00000 |
| m = 5 | 4.56000 × 10$^{-11}$ | 0.00000 | 0.00000 | 0.00000 |
| m = 6 | −1.84650 × 10$^{-11}$ | 1.07790 × 10$^{-12}$ | −2.13530 × 10$^{-13}$ | 0.00000 |
| m = 7 | 0.00000 | 0.00000 | 0.00000 | 0.00000 |
| m = 8 | −1.89860 × 10$^{-15}$ | −3.56790 × 10$^{-16}$ | 1.18980 × 10$^{-16}$ | 0.00000 |
| m = 9 | 0.00000 | 0.00000 | 0.00000 | 0.00000 |
| m = 10 | 3.13210 × 10$^{-19}$ | 4.74570 × 10$^{-20}$ | −1.21090 × 10$^{-20}$ | |
| m = 11 | 0.00000 | 0.00000 | | |
| m = 12 | −1.84730 × 10$^{-23}$ | | | |

The first and second surfaces 71 and 72 of the fθ optical element 70 are tilted with respect to the reference axis (so that the intersection angle will be off of 90 degrees) in regard to the auxiliary scanning direction, and the origin of each surface 71, 72 is shifted from the reference axis in the main scanning direction. Specific data of the tilt and the shift will be shown in the following Table 24.

TABLE 24

| | TILT REGARDING AUXILIARY SCANNING DIRECTION | SHIFT IN MAIN SCANNING DIRECTION |
|---|---|---|
| FIRST SURFACE 71 | −1.136° | −1.776 |
| SECOND SURFACE 72 | −1.753° | −1.841 |

As above, the first surface 71 of the fθ optical element 70 in the sixth example is symmetric with respect to its origin both in the main scanning direction and in the auxiliary scanning direction, and the origin is shifted from the reference axis in the main scanning direction. Therefore, with respect to the reference axis, the first surface 71 is asymmetric in the main scanning direction and symmetric in the auxiliary scanning direction. Meanwhile, the second surface 72 is asymmetric with respect to its origin both in the main scanning direction and in the auxiliary scanning direction, and the origin is shifted from the reference axis in the main scanning direction. Therefore, the second surface 72 is asymmetric both in the main scanning direction and in the auxiliary scanning direction also with respect to the reference axis.

FIGS. 10A through 10C are graphs showing optical performance of the reflective scanning optical system of the sixth example, in which FIG. 10A shows fθ error, FIG. 10B shows field curvature, and FIG. 10C shows scan line curvature. In the sixth example, the shift Δy [mm] of the origin of each graph (FIGS. 10A–10C) from the reference axis in the main scanning direction and the shift Δz [mm] of the origin of the graph of the scan line curvature (FIG. 10C) from the reference axis in the auxiliary scanning direction are Δy=−2.959 and Δz=12.000.

In the following, specific data (values) of the above examples regarding the aforementioned conditions (1)–(7) will be shown. The following Table 25 shows the magnification $m_z$ of the fθ optical element 70 in the auxiliary scanning direction which is specified by the condition (1).

TABLE 25

CONDITION (1): $-4 < m_z < -2$

| EXAMPLE | $m_z$ |
|---|---|
| FIRST EXAMPLE | −3.05 |
| SECOND EXAMPLE | −3.05 |
| THIRD EXAMPLE | −3.06 |
| FOURTH EXAMPLE | −3.06 |
| FIFTH EXAMPLE | −3.06 |
| SIXTH EXAMPLE | −3.06 |

The following Tables 26 and 27 show the values in the conditions (2) and (3), wherein P=50.00 mm in each example. All the examples satisfy the conditions (2) and (3).

TABLE 26

CONDITION (2): $0.15\Delta dz/dx(+1.0P) < \Delta dz/dx(+0.5P) < 0.30\Delta dz/dx(+1.0P)$

| EXAMPLE | $0.15\Delta dz/dx(+1.0P)$ | $\Delta dz/dx(+0.5P)$ | $0.30\Delta dz/dx(+1.0P)$ |
|---|---|---|---|
| FIRST EXAMPLE | 0.000280 | 0.000350 | 0.000560 |
| SECOND EXAMPLE | 0.000277 | 0.000328 | 0.000553 |
| THIRD EXAMPLE | 0.000301 | 0.000394 | 0.000602 |
| FOURTH EXAMPLE | 0.000312 | 0.000394 | 0.000623 |
| FIFTH EXAMPLE | 0.000326 | 0.000430 | 0.000651 |
| SIXTH EXAMPLE | 0.000343 | 0.000582 | 0.000686 |

TABLE 27

CONDITION (3): $0.45\Delta dz/dx(+1.0P) < \Delta dz/dx(+0.8P) < 0.60\Delta dz/dx(+1.0P)$

| EXAMPLE | $0.45\Delta dz/dx(+1.0P)$ | $\Delta dz/dx(+0.8P)$ | $0.60\Delta dz/dx(+1.0P)$ |
|---|---|---|---|
| FIRST EXAMPLE | 0.000840 | 0.000906 | 0.001120 |
| SECOND EXAMPLE | 0.000830 | 0.000874 | 0.001106 |
| THIRD EXAMPLE | 0.000903 | 0.000996 | 0.001204 |
| FOURTH EXAMPLE | 0.000945 | 0.001011 | 0.001246 |
| FIFTH EXAMPLE | 0.000977 | 0.001096 | 0.001303 |
| SIXTH EXAMPLE | 0.001030 | 0.001245 | 0.001373 |

The following Table 28 shows the values in the conditions (4) and (5) and the following Table 29 shows the values in the conditions (6) and (7). All the examples satisfy the conditions (4), (5), (6) and (7).

TABLE 28

CONDITION (4): $\Delta dz/dx(+0.8P)/\Delta dz/dx(+1.0P) < \Delta dz/dx(-0.8P)/\Delta dz/dx(-1.0P)$
CONDITION (5): $\Delta dz/dx(+0.5P)/\Delta dz/dx(+1.0P) < \Delta dz/dx(-0.5P)/\Delta dz/dx(-1.0P)$

| EXAMPLE | LEFT SIDE OF (4) | RIGHT SIDE OF (4) | LEFT SIDE OF (5) | RIGHT SIDE OF (5) |
|---|---|---|---|---|
| FIRST EXAMPLE | 0.485 | 0.514 | 0.187 | 0.192 |
| SECOND EXAMPLE | 0.472 | 0.519 | 0.178 | 0.194 |
| THIRD EXAMPLE | 0.497 | 0.516 | 0.196 | 0.207 |
| FOURTH EXAMPLE | 0.487 | 0.509 | 0.190 | 0.204 |
| FIFTH EXAMPLE | 0.505 | 0.523 | 0.198 | 0.209 |
| SIXTH EXAMPLE | 0.544 | 0.571 | 0.254 | 0.208 |

TABLE 29

CONDITION (6): $0.0010 < \delta(+1.0P) - \delta(+0.8P) < 0.0018$
CONDITION (7): $0.0007 < \delta(-1.0P) - \delta(-0.8P) < 0.0013$

| EXAMPLE | $\delta(+1.0P) - \delta(+0.8P)$ | $\delta(-1.0P) - \delta(-0.8P)$ |
|---|---|---|
| FIRST EXAMPLE | 0.001092 | 0.001093 |
| SECOND EXAMPLE | 0.001151 | 0.001157 |
| THIRD EXAMPLE | 0.001408 | 0.000808 |
| FOURTH EXAMPLE | 0.001622 | 0.000823 |
| FIFTH EXAMPLE | 0.001622 | 0.000823 |
| SIXTH EXAMPLE | 0.001639 | 0.000832 |

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

The present disclosure relates to the subject matter contained in Japanese Patent Application No. P2003-304690, filed on Aug. 28, 2003, which is expressly incorporated herein by reference in its entirety.

What is claimed is:

1. A reflective scanning optical system, comprising:
a light source unit for emitting a beam;
a polygon mirror having a plurality of reflecting surfaces parallel to its rotation axis, for reflecting and dynamically deflecting the beam emitted by the light source unit; and
a single fθ optical element having a first surface for refracting the beam dynamically deflected by the polygon mirror and a second surface for reflecting the beam refracted by the first surface and thereby letting the beam emerge from the first surface, for converging the beam on a scan target surface,
wherein magnification $m_z$ of the fθ optical element in an auxiliary scanning direction is set to satisfy:

$$-4 < m_z < -2 \qquad (1),$$

wherein the light source unit is set so that a central axis of the beam incident on the polygon mirror from the light source unit is in a plane orthogonal to the rotation axis of the polygon mirror and out of an effective scan range of the beam dynamically deflected by the polygon mirror in regard to a main scanning direction, and wherein the fθ optical element is placed so as to set each reflecting surface of the polygon mirror and the scan target surface optically conjugate with each other in regard to the auxiliary scanning direction and separate the beam incident upon the first surface and the beam emerging from the first surface from each other in the auxiliary scanning direction.

2. The reflective scanning optical system according to claim 1, wherein the second surface of the fθ optical element is a reflecting surface having positive power both in the main scanning direction and in the auxiliary scanning direction with its concave side facing the polygon mirror and is asymmetric both in the main scanning direction and in the auxiliary scanning direction.

3. The reflective scanning optical system according to claim 2, wherein the second surface of the fθ optical element satisfies the following conditions (2) and (3):

$$0.15\Delta dz/dx(+1.0P) < \Delta dz/dx(+0.5P) < 0.30\Delta dz/dx(+1.0P) \quad (2)$$

$$0.45\Delta dz/dx(+1.0P) < \Delta dz/dx(+0.8P) < 0.60\Delta dz/dx(+1.0P) \quad (3)$$

where "$\Delta dz/dx(Y)$" denotes a change in inclination $dz/dx$ at a position with a height Y in the main scanning direction from a reference axis as the central axis and its elongation of the beam incident on the first surface to be orthogonal to the scan target surface in regard to the main scanning direction, and "P" denotes the distance from the polygon mirror to the fθ optical element.

4. The reflective scanning optical system according to claim 2, wherein the second surface of the fθ optical element satisfies the following conditions (4) and (5):

$$\Delta dz/dx(+0.8P)/\Delta dz/dx(+1.0P) < \Delta dz/dx(-0.8P)/\Delta dz/dx(-1.0P) \quad (4)$$

$$\Delta dz/dx(+0.5P)/\Delta dz/dx(+1.0P) < \Delta dz/dx(-0.5P)/\Delta dz/dx(-1.0P) \quad (5)$$

where "$\Delta dz/dx(Y)$" denotes a change in inclination $dz/dx$ at a position with a height Y in the main scanning direction from a reference axis as the central axis and its elongation of the beam incident upon the first surface to be orthogonal to the scan target surface in regard to the main scanning direction, and "P" denotes the distance from the polygon mirror to the fθ optical element.

5. The reflective scanning optical system according to claim 3, wherein the second surface of the fθ optical element satisfies the following conditions (4) and (5):

$$\Delta dz/dx(+0.8P)/\Delta dz/dx(+1.0P) < \Delta dz/dx(-0.8P)/\Delta dz/dx(-1.0P) \quad (4)$$

$$\Delta dz/dx(+0.5P)/\Delta dz/dx(+1.0P) < \Delta dz/dx(-0.5P)/\Delta dz/dx(-1.0P) \quad (5).$$

6. The reflective scanning optical system according to claim 4, wherein the fθ optical element satisfies the following conditions (6) and (7):

$$0.0010 < \delta(+1.0P) - \delta(+0.8P) < 0.0018 \quad (6)$$

$$0.0007 < \delta(-1.0P) - \delta(-0.8P) < 0.0013 \quad (7)$$

where $\delta(Y) = \Delta C1_z(Y) - 2\Delta C2_z(Y)$ where "$\Delta C1_z(Y)$" denotes a change in curvature of the first surface in the auxiliary scanning direction at a position with a height Y in the main scanning direction from a reference axis as the central axis and its elongation of the beam incident on the first surface to be orthogonal to the scan target surface in regard to the main scanning direction, "$\Delta C2_z(Y)$" denotes a change in curvature of the second surface in the auxiliary scanning direction at the position with the height Y in the main scanning direction from the reference axis, and a sign of the height Y is minus on a side where the beam from the light source unit is incident on the polygon mirror and plus on an opposite side.

7. The reflective scanning optical system according to claim 5, wherein the fθ optical element satisfies the following conditions (6) and (7):

$$0.0010 < \delta(+1.0P) - \delta(+0.8P) < 0.0018 \quad (6)$$

$$0.0007 < \delta(-1.0P) - \delta(-0.8P) < 0.0013 \quad (7)$$

where $\delta(Y) = \Delta C1_z(Y) - 2\Delta C2_z(Y)$ where "$\Delta C1_z(Y)$" denotes a change in curvature of the first surface in the auxiliary scanning direction at a position with a height Y in the main scanning direction from the reference axis, "$\Delta C2_z(Y)$" denotes a change in curvature of the second surface in the auxiliary scanning direction at the position with the height Y in the main scanning direction from the reference axis, and a sign of the height Y is minus on a side where the beam from the light source unit is incident on the polygon mirror and plus on an opposite side.

8. The reflective scanning optical system according to claim 1, wherein the light source unit includes:
   a light source for emitting the beam;
   a collimator lens for collimating the beam emitted by the light source into a collimated beam; and
   an anamorphic lens for focusing the beam from the collimator lens in the auxiliary scanning direction in the vicinity of a reflecting surface of the polygon mirror.

9. The reflective scanning optical system according to claim 2, wherein each of the first and second surfaces of the fθ optical element is asymmetric with respect to its origin both in the main scanning direction and in the auxiliary scanning direction and the origin of each surface is shifted from a reference axis, as the central axis and its elongation of the beam incident on the first surface to be orthogonal to the scan target surface in regard to the main scanning direction, in the main scanning direction.

10. The reflective scanning optical system according to claim 2,
   wherein the first surface of the fθ optical element is asymmetric with respect to its origin in the main scanning direction and symmetric with respect to the origin in the auxiliary scanning direction with the origin shifted from a reference axis, as the central axis and its elongation of the beam incident on the first surface to be orthogonal to the scan target surface in regard to the main scanning direction, in the main scanning direction, and
   wherein the second surface of the fθ optical element is asymmetric with respect to the origin both in the main scanning direction and in the auxiliary scanning direction with the origin shifted from the reference axis in the main scanning direction.

11. The reflective scanning optical system according to claim 2,
wherein the first surface of the fθ optical element is symmetric with respect to its origin both in the main scanning direction and in the auxiliary scanning direction with the origin shifted from a reference axis, as the central axis and its elongation of the beam incident upon the first surface to be orthogonal to the scan target surface in regard to the main scanning direction, in the main scanning direction, and wherein the second surface of the fθ optical element is asymmetric with respect to the origin both in the main scanning direction and in the auxiliary scanning direction with the origin shifted from the reference axis in the main scanning direction.

* * * * *